United States Patent
Notani et al.

(10) Patent No.: US 8,086,588 B2
(45) Date of Patent: Dec. 27, 2011

(54) COMPUTER PROGRAM PRODUCT AND METHOD FOR SHARING INFORMATION BETWEEN MULTIPLE COMPUTER APPLICATIONS USING A GRAFTED MODEL NETWORK

(76) Inventors: Ranjit Notani, Southlake, TX (US); Greg Merrill, Flower Mound, TX (US)

( * ) Notice: Subject to any disclaimer, the term of this patent is extended or adjusted under 35 U.S.C. 154(b) by 282 days.

(21) Appl. No.: 12/511,313

(22) Filed: Jul. 29, 2009

(65) Prior Publication Data

US 2011/0029577 A1  Feb. 3, 2011

(51) Int. Cl.
*G06F 7/00* (2006.01)
*G06F 17/00* (2006.01)
*G06F 17/30* (2006.01)

(52) U.S. Cl. ......... 707/705; 707/793; 707/803; 707/810

(58) Field of Classification Search .................. 707/705, 707/636, 703, 756, 793, 803, 804, 806–810
See application file for complete search history.

(56) References Cited

U.S. PATENT DOCUMENTS

| | | | |
|---|---|---|---|
| 5,953,707 A | 9/1999 | Huang et al. | |
| 6,157,915 A | 12/2000 | Bhaskaran et al. | |
| 6,304,867 B1 * | 10/2001 | Schmidt | 1/1 |
| 6,574,631 B1 * | 6/2003 | Subramanian et al. | 1/1 |
| 6,578,005 B1 | 6/2003 | Lesaint et al. | |
| 6,801,229 B1 * | 10/2004 | Tinkler | 715/853 |
| 7,130,885 B2 * | 10/2006 | Chandra et al. | 709/206 |
| 7,212,976 B2 | 5/2007 | Scheer | |
| 7,523,142 B2 * | 4/2009 | Driesen et al. | 1/1 |
| 7,716,189 B1 * | 5/2010 | Panchbudhe et al. | 707/691 |
| 7,809,659 B1 * | 10/2010 | Paiz | 706/20 |

(Continued)

FOREIGN PATENT DOCUMENTS

WO  WO 0227614  4/2002

(Continued)

OTHER PUBLICATIONS

Freeman, Eva, "Supply chain: modeling makes the difference," Datamation, v43, n10 p64 (5), Oct. 1997.

(Continued)

*Primary Examiner* — Don Wong
*Assistant Examiner* — Merilyn Nguyen

(57) ABSTRACT

A computer program product and method for sharing information between multiple computer applications using a grafted model network. The method includes creating a first model having one or more pre-defined fields, defining one or more application-defined fields, associating the first model with the first application project, associating the one or more application-defined fields with the second application project, grafting the one or more application-defined fields to the first model, building the first and second application projects, and dynamically installing the first and second application projects on a software platform. Building the first application project comprises creating a first database table having one or more table columns corresponding to the pre-defined fields of the first model in a database. Building the second application project comprises adding one or more table columns to the first database table corresponding to the application-defined fields in the database. Dynamically installing the first application project enables the one or more table columns corresponding to the pre-defined fields of the first model to be accessed via the software platform by the first computer application upon execution on a computer, and dynamically installing the second application project enables the one or more table columns corresponding to the pre-defined fields of the first model and the application-defined fields to be accessed via the software platform by the second computer application upon execution on the computer.

10 Claims, 31 Drawing Sheets

U.S. PATENT DOCUMENTS

| | | | |
|---|---|---|---|
| 2002/0087438 | A1 | 7/2002 | Kunieda et al. |
| 2002/0095457 | A1 | 7/2002 | Sharma et al. |
| 2003/0018546 | A1 | 1/2003 | Ayala et al. |
| 2003/0050819 | A1 | 3/2003 | Koenigbauer et al. |
| 2003/0078846 | A1 | 4/2003 | Burk |
| 2003/0233264 | A1 | 12/2003 | Jones et al. |
| 2004/0030428 | A1 | 2/2004 | Crampton et al. |
| 2004/0128261 | A1 | 7/2004 | Olavson et al. |
| 2005/0209732 | A1 | 9/2005 | Audimoolam et al. |
| 2006/0271390 | A1* | 11/2006 | Rich et al. ............... 705/1 |
| 2010/0223284 | A1* | 9/2010 | Brooks et al. .......... 707/769 |
| 2010/0325173 | A1* | 12/2010 | Haley et al. ........... 707/804 |

FOREIGN PATENT DOCUMENTS

| | | |
|---|---|---|
| WO | WO 0235393 | 5/2002 |
| WO | WO 0235438 | 5/2002 |
| WO | WO 0250633 | 6/2002 |

OTHER PUBLICATIONS

Mason-Jones, R., Towill, D.R., "information enrichments: designing the supply chain for competitive advantage," Supply Chain Management, v2n4, pp. 137, 1997.

Chandrashekar, Ashok, Schary, Philip, B, "Toward the virtual supply chain: The convergence of IT and organization," International Journal of Logistics Management, v10n2, pp. 2.

Desmond, John R, "Chain Reaction," Software Magazine, Sep. 1999.

Neofora.com, Inc, to Acquire U.S. Lifeline, inc., Leader in Supply Chain Content to Extend Neoforma.com's Service Offering, Business Wire, Mar. 9, 2000.

Motwani, Jaideep, Madan, Manu, Gunasekaran, A., "Information technology in managing global supply chains," Logistics Information Management, v.13n5, pp, 320-327, 2000.

Prasad, Sameer, Tata, Jasmine, "Information Investment in supply chain management," Logistics Information Management, v.13n1, pp. 33-38, 2000.

Smith, Mark, "Business-Critical Prism: A Strategic Assessment Guide for BI Products," intelligent Enterprise, 4, 15, 29, Oct. 4, 2001.

Yan, Shangyao, Tu, Yu-Ping, "Multifleet routing and multistop flight scheduling for schedule perturbation," European Journal of Operational Research, 1997, vol. 103 pp. 155-16.

Notani et al., U.S. Appl. No. 10/887,468, entitled "Non-Stale Incremental Planning," Dec. 26, 2008 (Pending).

Notani et al., U.S. Appl. No. 10/887,218, entitled "Real-Time Planning and Execution with Minimum Perturbation," Jul. 8, 2004 (Abandoned).

Jan et al., U.S. Appl. No. 10/060,572, entitled "Method and Apparatus for Providing Intelligent and Controlled Access to Supply Chain . . . ," Jan. 29, 2002 (Now 7,739,121).

Notani et al., U.S. Appl. No. 12/730,805, entitled "Computer Program Product and Method for Sales Forecasting and Adjusting a Sales Forecast," Mar. 24, 2010 (Pending).

Notani et al., U.S. Appl. No. 13/165,789, entitled "System, Computer Program and Method for Implementing and Managing a Value Chain Network," Jun. 21, 2011 (Pending).

* cited by examiner

*Vehicle.model | *User.adfs | *app-descriptor.xml

Application Descriptor Editor

▼ Application Info

Application details, including identifiers, version and description.

Application ID (3-Letter Code): SMP
Application Name: Sample
Author's Domain: sample.com
Application Version: 1.0

Details:

▼ Dependencies

Define Application Dependencies

Platform Location: c:/views/7.4_latest/install
Platform Version: 7.4
Application dependencies:

| Application ID (3-Letter Code) | Application Version |
|---|---|
| SCH | 1.0 |
| TMS | 1.0 |
|  |  |
|  |  |

Add
Delete

```
Problems | Javadoc | Declaration | Search | ■ Console ⊠ | Tasks | Properties
<terminated> Sample build.xml □ [Ant Build] C:\views\third-party\jdk\jdk1.6.0_03\bin\javaw.exe (May 1, 2009 11:42:24 AM)
[webdoclet] - Running <strutsconfigxml/>
[webdoclet] - Generating output 'struts-config.xml' using template file 'jar:file:/C:/views/7.4_latest/studio/build/studio/eclipse/plugins/com.transcends
    [copy] Copying 1 file to C:\views\third-party\jboss\jboss-4.0.2\server\7.4_latest\deploy\dvce.ear\dvce.war\WEB-INF\apps\Sample
deploy:
base-build:
build:
BUILD SUCCESSFUL
Total time: 40 seconds
```

```
C:\WINDOWS\system32\cmd.exe
Buildfile: instance-installer\build.xml
check-properties:
create-node-config:
init:
create-config-prop:
run-plt-installer:
set-os-paths:
os-paths:
init:
check-for-dataset:
clean-dataset:
clean-jboss:
   [delete] Deleting: C:\PLT\one-plt-7.4.71787\third-party\jboss\jboss-4.0.2\server\platform_7.4\conf\jboss-service.xml
   [delete] Deleting: C:\PLT\one-plt-7.4.71787\thi
clean-bin:                                          C:\PLT\platform_7.4-71787
   [delete] Deleting directory C:\PLT\one-plt-7.4.   File  Edit  View  Favorites  Tools  Help
clean-config:                                       Back ▼   ▼          C:\PLT\platform_7.4-71787
   [delete] Deleting directory C:\PLT\one-plt-7.4.   Address
clean-schema:                                                                     Search    Folders
   [delete] Deleting directory C:\PLT\one-plt-7.4.   File and Folder Tasks        Name             Size
   [delete] Deleting directory C:\PLT\one-plt-7.4.        Make a new folder       apps
   [delete] Deleting directory C:\PLT\one-plt-7.4.        Publish this            datasets
clean:                                                    folder to the Web      instance-installer
setup-script-env:                                         Share this folder      install.bat       1KB
   [copy] Copying 1 file to C:\PLT\one-plt-7.4.7                                  install_help.html 4KB
   [copy] Copying 1 file to C:\PLT\one-plt-7.4.7
```

Standard Retail Process Template.spt

Views

▼ Views

Specify views for "Standard Purchase Order".

| Name | Level | View Type | Based On |
|---|---|---|---|
| AuditTrailView | OrderHeader | Audit Trail View | HeaderSearchByKey |
| Buffer Lane to List | OrderSchedule | Buffer Lane to List | ScheduleSearchItemShipfromS |
| Buffer List-to-Demand Allocation Schedule List | OrderSchedule | Buffer-to-Outbound List | ScheduleSearchOutboundQuery |
| Buffer List-to-In Transit Schedule List | OrderSchedule | Buffer-to-Inbound List | ScheduleSearchInboundQuery |
| Headers by Supplier Org | OrderHeader | Search-to-List | Headers By Partner Org |
| HeadersByNumber | OrderHeader | Search-to-List | HeaderSearchOrderNumber |

Add
Delete

▼ View Details

Specify View Details for "Headers by Supplier Org".

| Query | Constraints and Defaults | Display | Permissions |

Please refine the Query for "Headers by Supplier Org".

| Level or Field | Search | Retrieve |
|---|---|---|
| ⊟ OrderHeader | | |
| ApprovedBy | not used | ☐ |
| ApprovedOn | not used | ☐ |
| AttachedNoteCount | not used | ☐ |
| AttachedNotes | | ☐ |
| BUY_ORG | required value (intrinsic) | ☑ (intrinsic) |

FIG. 10Q

Standard Retail Process Template.spt

Actions
▶ Actions
Specify actions for OrderHeader.

| Name | Type | Write Type | In State Diagram | Sys of Control | Action Screen | Launch Workflow |
|---|---|---|---|---|---|---|
| UpdateAttachedNotes | Write | Loop | no | no | N/A | N/A |
| UpdateOrder | Write | Loop | no | yes | Order List-to-Action | N/A |
| UpdateOrderComp ds | Write | Loop | no | no | N/A | N/A |
| UpdateOrderWithAttch | Write | Standard | no | yes | N/A | UpdateOrderWith |

Add
Delete

▶ Action Details
Specify Details for "UpdateOrder".
Write Mask | Permissions | States | Callback
Specify Write Mask for "UpdateOrder".

| Level or Field | Mask | Default |
|---|---|---|
| ☐ OrderHeader | disallow creation | |
| ApprovedBy | optional | N/A |
| ApprovedOn | optional | N/A |
| AttachedNoteCount | optional | N/A |
| AttachedNotes | optional | N/A |
| BUY_ORG | optional | None |
| BUY_ROLE | optional | N/A |
| BillToAddress | optional | N/A |
| BuyerNotes | optional | N/A |
| CancellationReason | optional | N/A |

```xml
<ModelReadRequest xmlns="http://www.transcendsys.com/ValueChain">
    <ViewRef>
        <CustomViewRef>
            <ProcessTypeName>Standard Retail Process Template</ProcessTypeName>
            <ProcessTypeVersion>1.0</ProcessTypeVersion>
            <TransactionName>Standard Shipment</TransactionName>
            <CustomViewName>Shipment Line Search-to-List</CustomViewName>
        </CustomViewRef>
    </ViewRef>
    <FilterValues>
        <FilterValue>
            <FieldRef category="PDF" levelType="ShipmentHeader">
                <FieldName>ShipmentNumber</FieldName>
            </FieldRef>
            <Values>
                <StringValue>1</StringValue>
            </Values>
        </FilterValue>
    </FilterValues>
</ModelReadRequest>
```

FIG. 12A

```xml
<ModelList xmlns="http://www.transcendsys.com/ValueChain" xmlns:jxb="http://
    java.sun.com/xml/ns/jaxb" xmlns:xsi="http://www.w3.org/2001/XMLSchema-instance"
    xsi:schemaLocation="http://www.transcendsys.com/ValueChain
..\..\..\..\..\server\schema\xsd\trans\ModelList.xsd">
  <ValueChainId>100</ValueChainId>
  <CustomModelName>Standard Shipment</CustomModelName>
  <Shipment>
    <ValueChainId>100</ValueChainId>
    <ShipmentNumber>1</ShipmentNumber>
  <CreationEnterpriseName>ProgressiveRetailer</CreationEnterpriseName>
    ....
  </Shipment>
</ModelList>
```

FIG. 12B

```
<ModelList xmlns="http://www.transcendsys.com/ValueChain"
    xmlns:jxb="http://java.sun.com/xml/ns/jaxb"
    xmlns:xsi="http://www.w3.org/2001/XMLSchema-instance"
    xsi:schemaLocation="http://www.transcendsys.com/ValueChain
..\..\..\..\..\server\schema\xsd\trans\ModelList.xsd">
  <ValueChainId>100</ValueChainId>
  <CustomModelName>Standard Shipment</CustomModelName>
  <ActionName>CreateShipment</ActionName>
  <Shipment>
    <ValueChainId>100</ValueChainId>
    <ShipmentNumber>1</ShipmentNumber>
  <CreationEnterpriseName>ProgressiveRetailer</CreationEnterpriseName>
    ....
  </Shipment>
</ModelList>
```

FIG. 12C

```
<ModelWriteRequest xmlns="http://www.transcendsys.com/ValueChain">
<ModelList>
<ValueChainId>100</ValueChainId>
<CustomModelName>Standard Shipment</CustomModelName>
<Shipment>
<ValueChainId>100</ValueChainId>
<ShipmentNumber>1</ShipmentNumber>
<CreationEnterpriseName>ProgressiveRetailer</CreationEnterpriseName>
....
</Shipment>
</ModelList>
</ModelWriteRequest>
```

FIG. 12D

COMPUTER PROGRAM PRODUCT AND METHOD FOR SHARING INFORMATION BETWEEN MULTIPLE COMPUTER APPLICATIONS USING A GRAFTED MODEL NETWORK

BACKGROUND OF THE INVENTION

1. Field of the Invention

The present invention is generally related to computer networks, and more particularly to a computer program product and method for sharing information between multiple computer applications using a grafted model network.

2. Discussion of the Background

In an increasingly global economy, there is a need for computer networks to share information between computer applications and to better adapt to meet the needs of the business enterprise(s) and computer applications using such networks.

Three arrangements that are known in the prior art for sharing information between computer applications are shown in FIGS. 1A-1C. According to these arrangements, separate databases 12a-12e are maintained by computer applications A1-A5. Databases 12a-12e contain the respective computer application's A1-A5 version of the information. Information is periodically communicated between the computer applications A1-A5 by means of messaging and/or other techniques known in the prior art. One or more of the databases 12a-12e are updated based on the received information. In the first arrangement shown in FIG. 1A, the information is directly communicated from one computer application to another computer application. In the second arrangement shown in FIG. 1B, the information is indirectly communicated between the computer applications by means of an enterprise service bus 24. In the third arrangement shown in FIG. 1C, master data management ("MDM") 34 and business process management ("BPM") 36 are utilized, and the information is indirectly communicated between the computer application by means of an enterprise service bus 24. MDM 34 comprises a set of processes and tools that manage non-transactional data entities of an organization. BPM 36 comprises a collection of related, structured activities that produce a service or product that meet the needs of a client.

Each of these arrangements are deficient because the information is typically copied or replicated many times. Further, databases 12a-12e contain the respective computer application's A1-A5 own version of the information. Information contained within databases 12a-12e may not be updated on a timely and/or consistent basis for all databases 12a-12e and therefore there likely exists inconsistencies in the information. Further, the information contained within databases 12a-12e is likely to be customized or altered for the particular computer application A1-A5. As such, different information may be stored in databases 12a-12e and the information stored in each of the databases 12a-12e may not be updated to include the most current information. There is therefore no single version of the truth with respect to the information.

Another arrangement that is known in the prior art for sharing information is shown in FIG. 1D. According to this arrangement, enterprise resource planning ("ERP") 54 is in communication with an enterprise service bus 24. An ERP integrates the data and processes of an organization into one single system. ERP systems will normally include many components, including hardware and software, in order to achieve integration. Most ERP systems use a unified database to store data for various functions found throughout an organization. ERP allows multiple departments or organizations, having different computer applications A1-A5, within a company to utilize the same computer system and data. Typically, computer applications A1-A5 are provided by a single software vendor to handle the different needs of a company's departments and organizations. For instance, the ERP 54 may include computer applications A1-A5 to handle manufacturing, financials, human resources, supply chain management, and the like. Because most ERP systems use a unified database, much of the information is available to all of the computer applications A1-A5 in the ERP 54 using the unified database. However, in situations in which a computer application is utilized that is not a part of the ERP and needs access to the information, such information may be periodically indirectly communicated between the ERP 54 and the computer applications by means of the enterprise service bus 24 and messaging and/or other techniques known in the prior art.

Although this arrangement provides a single version of the truth, and reduced copying and replication, it also includes significant deficiencies. The computer applications utilized in the ERP 54 are very tightly coupled and typically from a single software vendor. As such, there typically exists a dependency on a single software vendor. Such reliance on a single software vendor generally is problematic. Further, the inability to upgrade different "applications" of ERP 54 independent of other applications of the ERP 54 results in long upgrade cycles for the computer applications. Additionally, ERP's are not suited to representing and executing multi-enterprise processes in an optimal way.

ERP known in the prior art included the concept of user-defined fields. However, the user-defined fields known in the prior art do not provide support for the co-existence of multiple independent, independently-developed applications on the ERP. This is because, according to the prior art, user-defined fields names are not scoped by an application, and user-defined fields are not bundled with an application: (a) groups of user-defined fields cannot be separately versioned; (b) cross-model groups of user-defined fields are not packaged as a unit; and (c) cross-model groups of user-defined fields cannot be installed and uninstalled as an atomic unit.

Thus, there currently exist deficiencies in sharing information between multiple computer applications.

SUMMARY OF THE INVENTION

Accordingly, one aspect of the present invention is to provide a computer program product embodied on a computer readable medium for sharing information between multiple computer applications using a grafted model network. The computer program product includes a first computer code for creating first and second application projects having a plurality of user-defined application details, a second computer code for creating a first model having one or more pre-defined fields, a third computer code for defining one or more application-defined fields, a fourth computer code for associating the first model with the first application project, a fifth computer code for associating the one or more application-defined fields with the second application project, a sixth computer code for grafting the one or more application-defined fields to the first model, a seventh computer code for building the first application project, an eighth computer code for building the second application project, and a ninth computer code for dynamically installing the first and second application projects on a software platform. The first application project is associated with a first computer application, and the second application project is associated with a second computer application. Building the first application project comprises creating a first database table having one or more table columns corresponding to the pre-defined fields of the first model in a database. Building the second application project comprises adding one or more table columns to the first database table corresponding to the application-defined fields in the database. Dynamically installing the first application project enables the one or more table columns corresponding to the pre-defined fields of the first model to be accessed via the software platform by the first computer application upon execution. Dynamically installing the second application project enables the one or more table columns corresponding to the pre-defined fields of the first model and the application-defined fields to be accessed via the software platform by the second computer application upon execution.

Another aspect of the present invention is to provide a method for sharing information between multiple computer applications using a grafted model network. The method includes creating a first model having one or more pre-defined fields, defining one or more application-defined fields, associating the first model with the first application project, associating the one or more application-defined fields with the second application project, grafting the one or more application-defined fields to the first model, building the first and second application projects, and dynamically installing the first and second application projects on a software platform. Building the first application project comprises creating a first database table having one or more table columns corresponding to the pre-defined fields of the first model in a database. Building the second application project comprises adding one or more table columns to the first database table corresponding to the application-defined fields in the database. Dynamically installing the first application project enables the one or more table columns corresponding to the pre-defined fields of the first model to be accessed via the software platform by the first computer application upon execution on a computer. Dynamically installing the second application project enables the one or more table columns corresponding to the pre-defined fields of the first model and the application-defined fields to be accessed via the software platform by the second computer application upon execution on the computer.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein:

FIGS. 12A-12D are exemplary XML files associated with sharing information between multiple computer applications using a grafted model network in accordance with an embodiment of the present invention.

DETAILED DESCRIPTION THE PREFERRED EMBODIMENTS

Figure 1A:
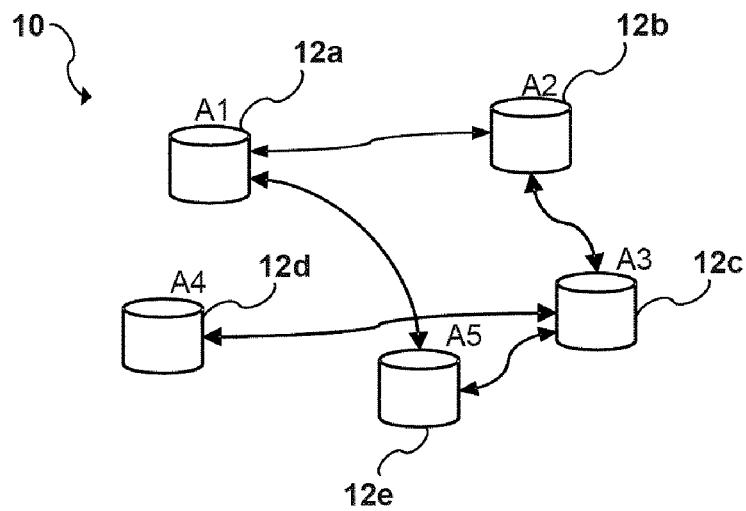
FIGS. 1A-1D are block diagrams illustrating arrangements for sharing information between computer applications that are known in the prior art.
Figure 1B:
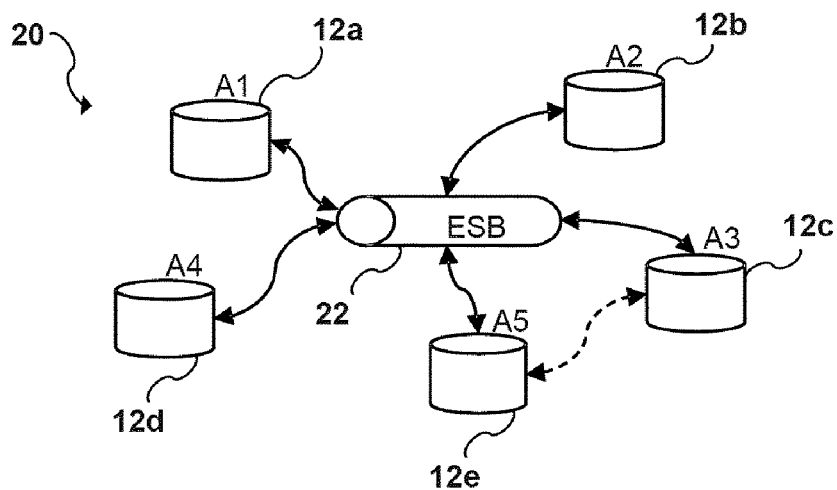
Figure 1C:
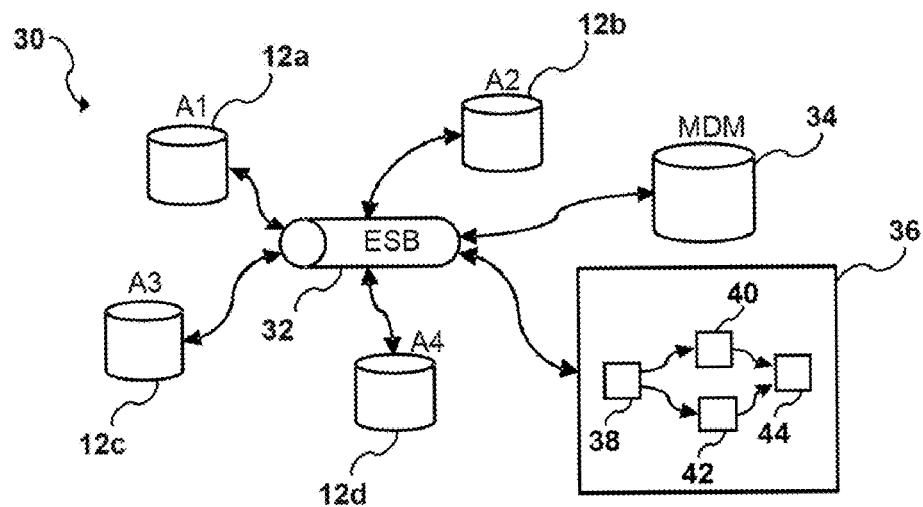
Figure 1D:
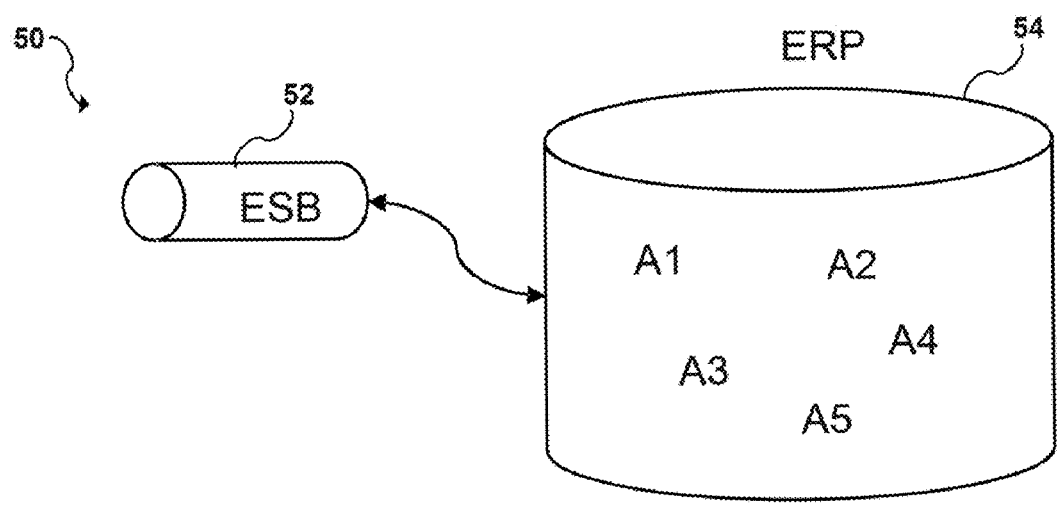

Referring now to the drawings, wherein like reference numerals designate identical or corresponding parts throughout the several views, preferred embodiments of the present invention are described.

In order to provide the most current information between computer applications over a computer network, it is critical to provide the most current information. Information may be shared between computer applications using either (a) a single version of the truth, or (b) multiple versions of the truth. As used herein, a "single version of the truth" is an arrangement in which the same data in its most current/updated form is accessible by multiple computer applications and/or multiple parties. In order to maintain a single version of truth, any single data element is generally represented in a single location. Conversely, multiple versions of the truth are stored in multiple locations. However, in situations where there are multiple versions of the truth, each of the locations must be updateable simultaneously. Otherwise, by definition there is at least temporary inconsistencies with respect to the representation of the data. Therefore, the information may or may not be the most current. In practice, multiple versions of the truth with simultaneous updating is generally not feasible and a non-stale system cannot be built on such a representation.

As used herein, a "computer application" is a computer executable software application of any type that executes processing instructions on a computer or embedded in a processor, and an "application" or "application project" is are the files, objects, structures, database resources and other resources used in integrating a computer application into the software platform of the present invention.

Figure 2:
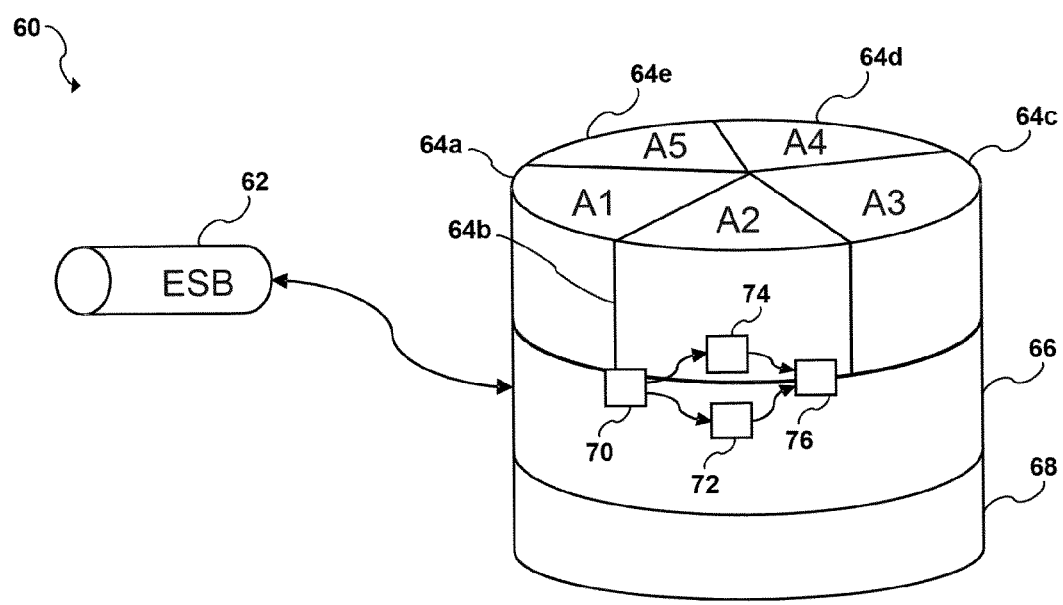
FIG. 2 is a block diagram illustrating an arrangement for sharing information between multiple computer applications using a grafted model network in accordance with an embodiment of the present invention.

Referring to FIG. 2, a block diagram illustrating an arrangement for sharing information between multiple computer applications using a grafted model network in accordance with an embodiment of the present invention is shown. According to this arrangement, a single version of truth is utilized by computer applications A1-A5. Information may be periodically communicated to other computer applications (not shown) by means of messaging and/or other techniques known in the prior art. There is minimal data replication. Computer applications can be upgrade independent of each other. New computer applications can be easily created or customized by the company.

According to one embodiment of the present invention, an application includes without limitation:
    models (also referred to as model definitions);
    Java code;
    extensible markup language ("XML") and other related
        XML objects, user interface resources (e.g., Java server pages ("JSPs"), images and the like);
software platform engine definitions;
structured query language ("SQL");
data definition language ("DDL"); and
other resources (e.g, XML binding objects ("JAXB"), Java data access objects ("DAO"), model mapping files (.model), application-defined fields files (.adfs), and the like).

According to one embodiment, an application includes without limitation an identifier (e.g., "SMP") and a name (e.g., "Sample"). The identifier is used to scope the namespace database-level resources and the name is used to scope the namespace of Java-level resources. Multiple applications can have the same identifier or name, but cannot be deployed on the same software platform As used herein, a "model" is an entity which is represented in a database (as broadly defined and including without limitation anything stored on a computer readable medium or residing in memory) and supports integration, business process variation and visibility. Examples of models include without limitation, "Order," "Shipment," "User," "Item," "Vendor," "Site" and the like. A model may be defined in a model file (.model), and includes of without limitation a model name, levels and one or more fields. A model may also include one or more methods. A model name is used to identify the model. Levels represent large portions of a model. For instance, an "Order" model might include an "OrderHead" and an "OrderLine" as two levels of the model. Fields represent data fields within the model. Each field includes without limitation a name, a type and a key. Types include without limitation Integer, Float, Monetary, DataRange, and the like. According to one embodiment, several resources or objects are generated based on the model file (.model) including without limitation:
  XML schema definition ("XSD") which allows the model to be integrated using XML;
  XML binding objects ("JAXB") which can be used to marshal or unmarshal model data to or from XML;
  Data definition language ("DDL") which can be used to create database tables or foreign key constraints, indexes and the like representing the model in a database; and
  Java data access objects ("DAO") which can be used to easily read or write model data to or from the database.

In one embodiment, models include application models and core models. Application models may be standalone or grafted. At runtime, models are fused together into a fused model. Methods on the models are arranged to operate on the root path of the fused model. Fusion occurs when an application is installed on the computer system. Defusion occurs when the application is uninstalled from the computer system. All application models are fused or defused as a unit.

Optionally, application-defined fields may be grafted to the models of certain applications. As used herein, "application-defined fields" or "ADF" represent data fields of an application which are grafted onto existing models of other applications. Application-defined fields may be defined in an ADF file (.adfs), and include without limitation a model name and a field. The model name identifies the model. Fields represent data fields that will be grafted onto a model and become part of a grafted model. As used herein, a "grafted model" refers to a computer application's view of a model which includes both pre-defined fields defined by an application project, and all of the fields (also referred to as application-defined fields or "ADF") grafted in one or more applications projects. According to the present invention, pre-defined fields, amongst other things, support the co-existence of multiple independent, independently-developed applications on an ERP. Each field includes without limitation a name and a type. Types include without limitation Integer, Float, Monetary, DataRange, and the like. According to one embodiment, several resources or objects are generated based on the ADF file (.adfs) including without limitation:
  XML schema definition ("XSD") which can be supplied as a child of the parent model at runtime using XSD substititonGroups;
  XML binding objects ("JAXB") which can be used to marshal or unmarshal model data to or from XML;
  Data definition language ("DDL") which can be used to add columns, foreign key constraints, indexes and the like to existing database tables in a database; and
  Java data access objects ("DAO") which can be used to easily read or write model data to or from the database and includes the application-defined fields.

Figure 6:
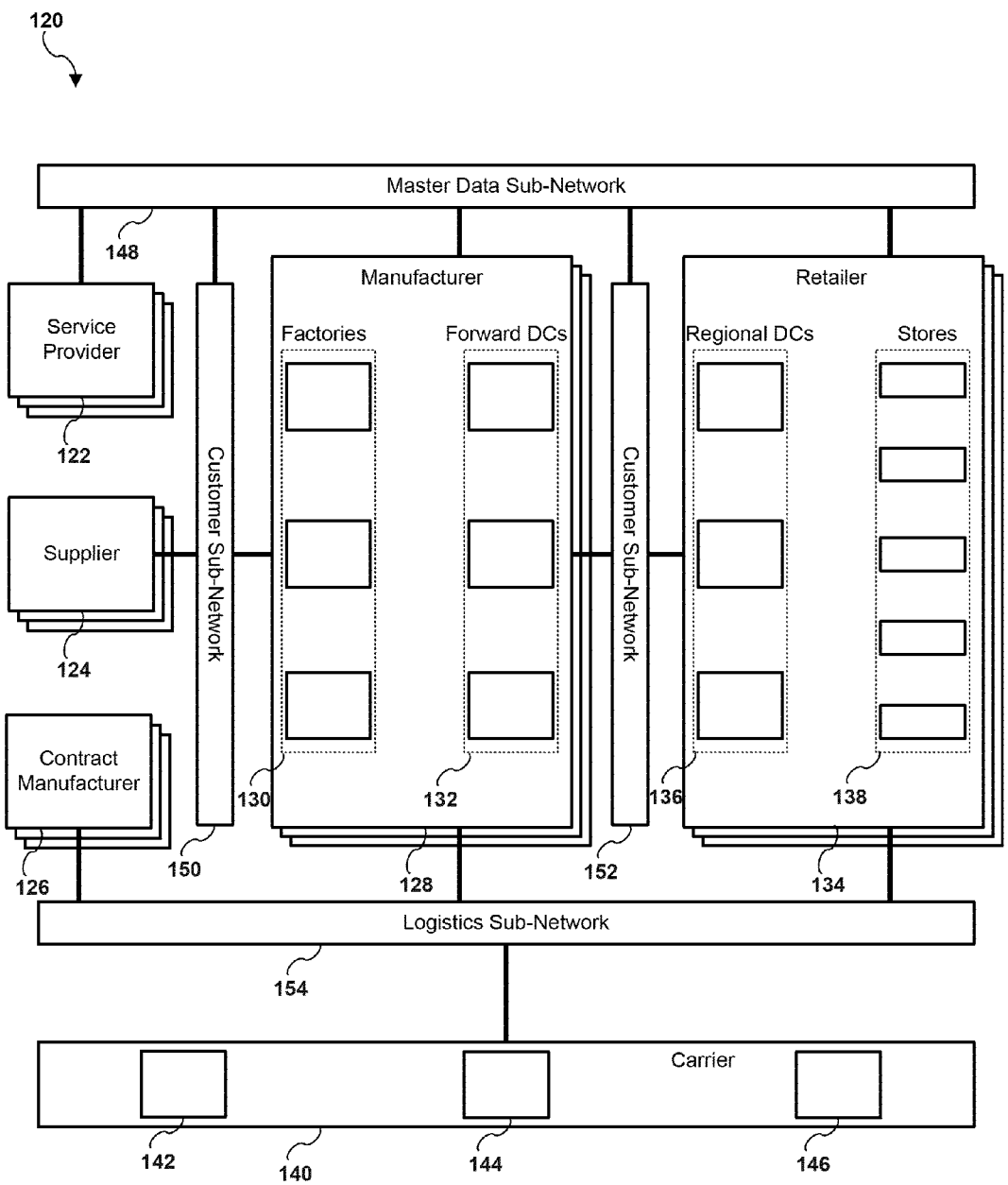
FIGS. 6 and 7 are block diagrams illustrating exemplary sub-networks used in a supply chain in accordance with an embodiment of the present invention.
Figure 7:
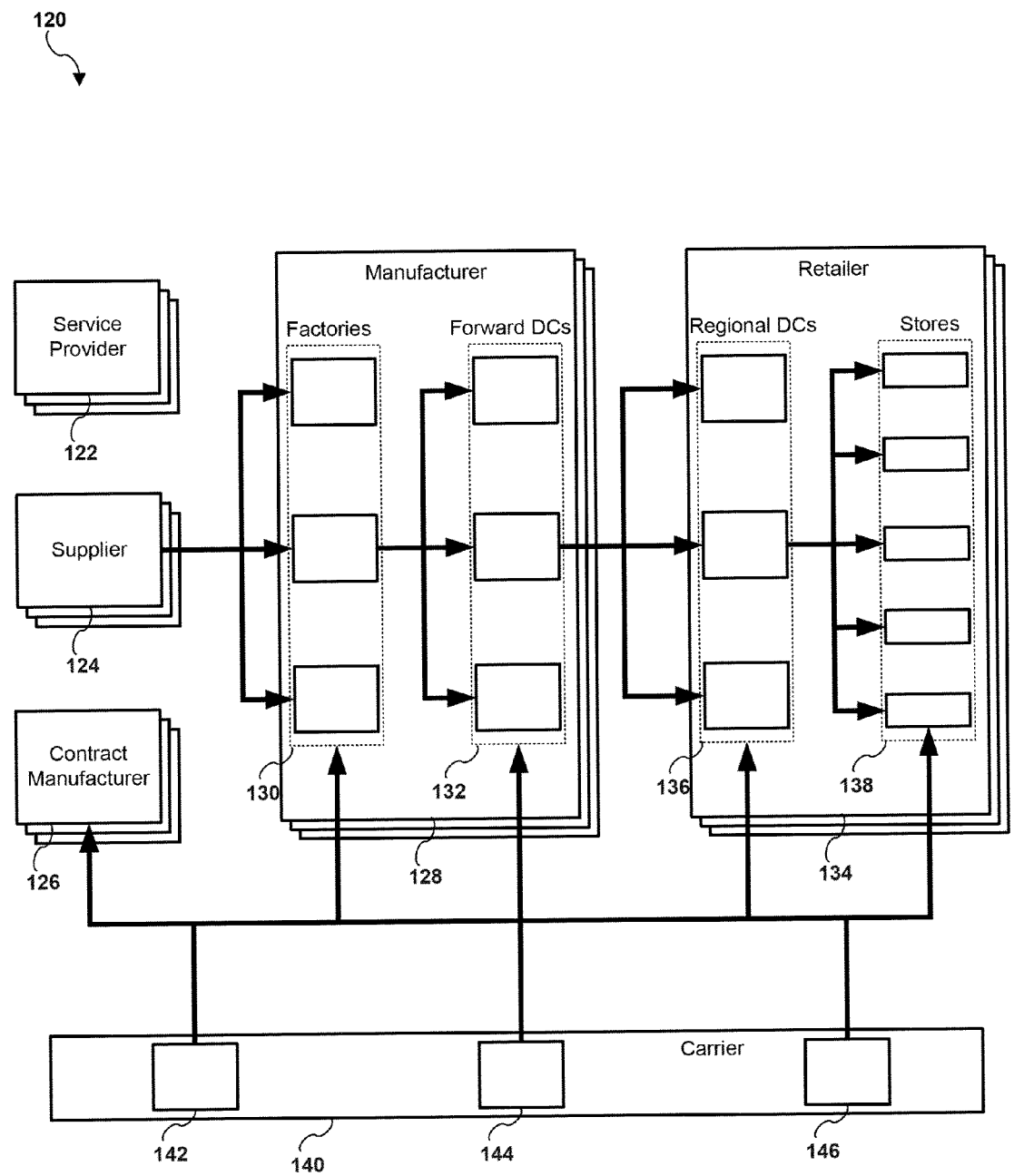

Referring to FIGS. 6 and 7, block diagrams illustrating exemplary sub-networks used in a supply chain in accordance with an embodiment of the present invention are shown. A common network environment may include a many-to-many network of enterprises in which any enterprise can execute business process with any other enterprise of the network. The common network environment may include multiple sub-networks overlaid.

In other embodiments, application-defined fields and pre-defined fields are mapped into columns on the model table, columns on another related table, fields on object-oriented databases, in-memory fields of in-memory models, or the like.

I. FLOW CHARTS ILLUSTRATING METHOD FOR SHARING INFORMATION

Figure 9A:
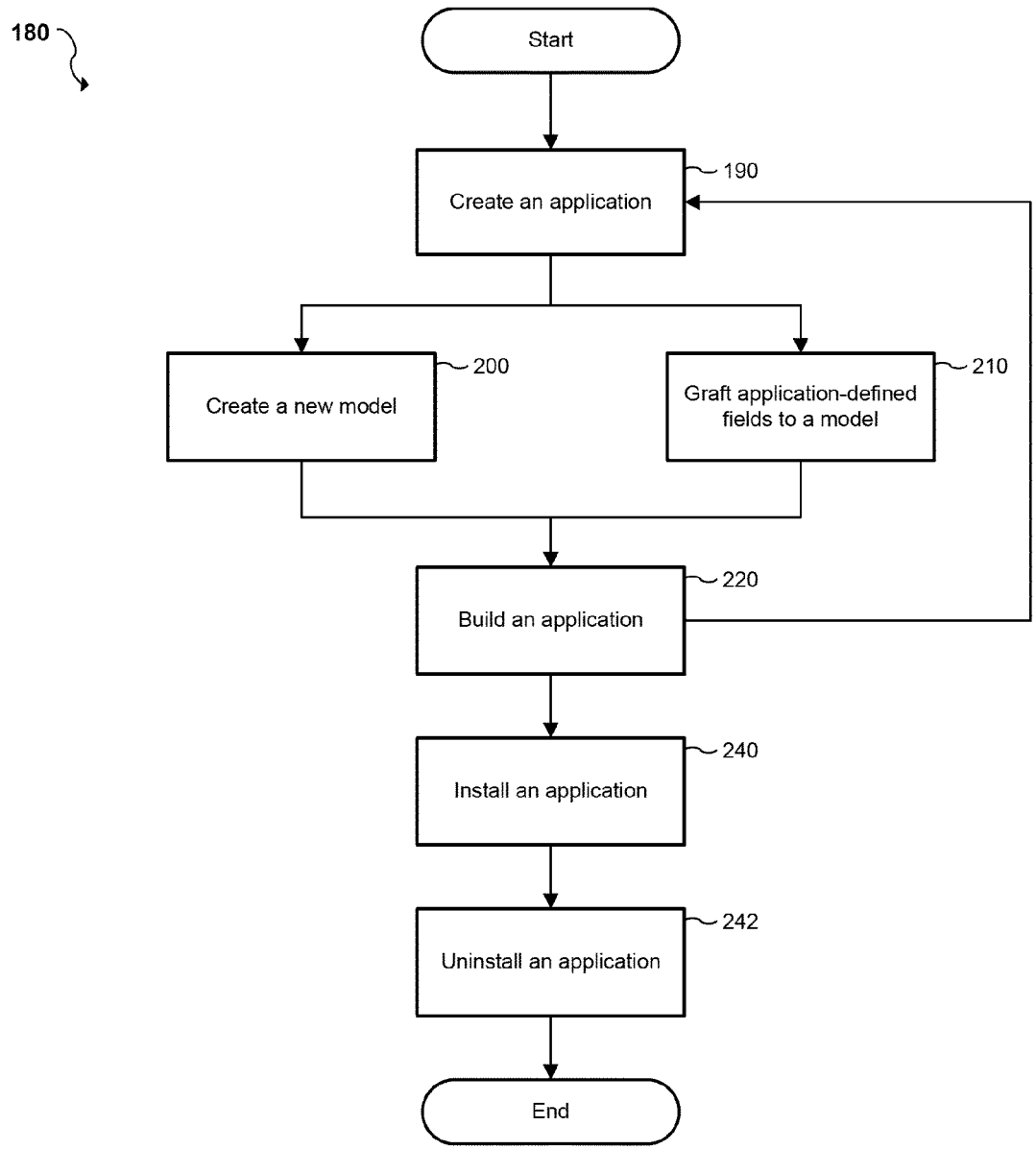
FIGS. 9A-9E are flow charts illustrating a method for sharing information between multiple computer applications using a grafted model network in accordance with an embodiment of the present invention.
Figure 9B:
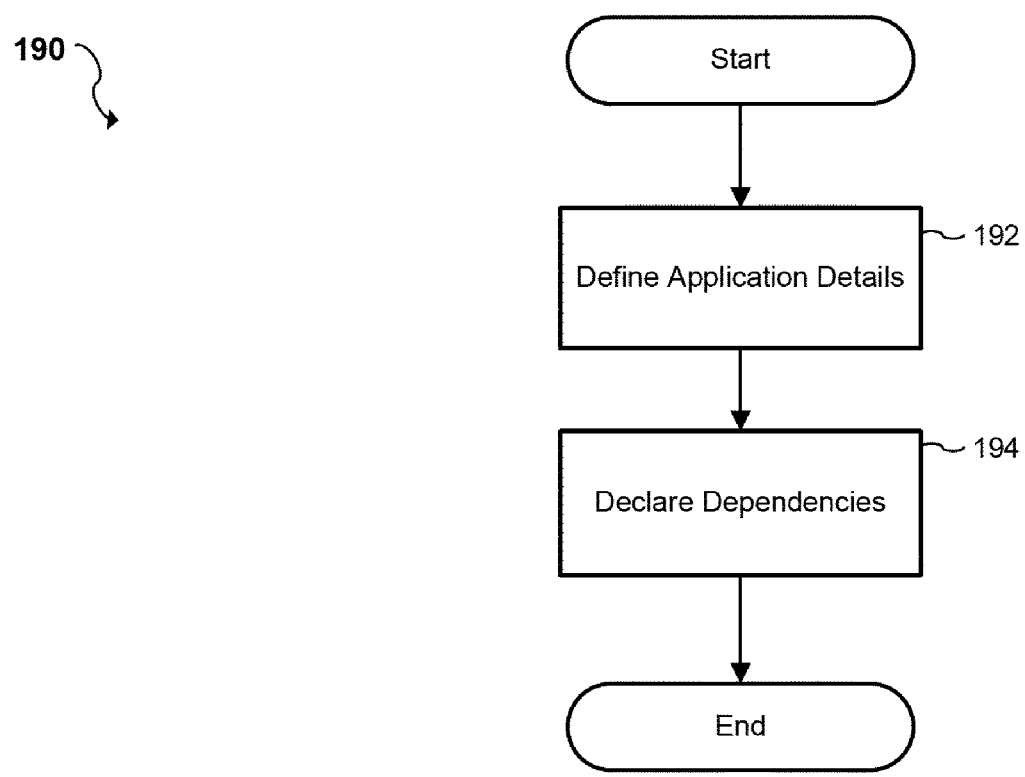

Referring to FIGS. 9A-9E, flow charts illustrating a method for sharing information between multiple computer applications using a grafted model network in accordance with an embodiment of the present invention are shown. At block 190, an application is created. Creating an application may involve several steps as shown in FIG. 9B. Application details are provided at block 192. Optionally, one or more dependencies to other applications (as described further below) are declared at block 194.

Figure 9C:
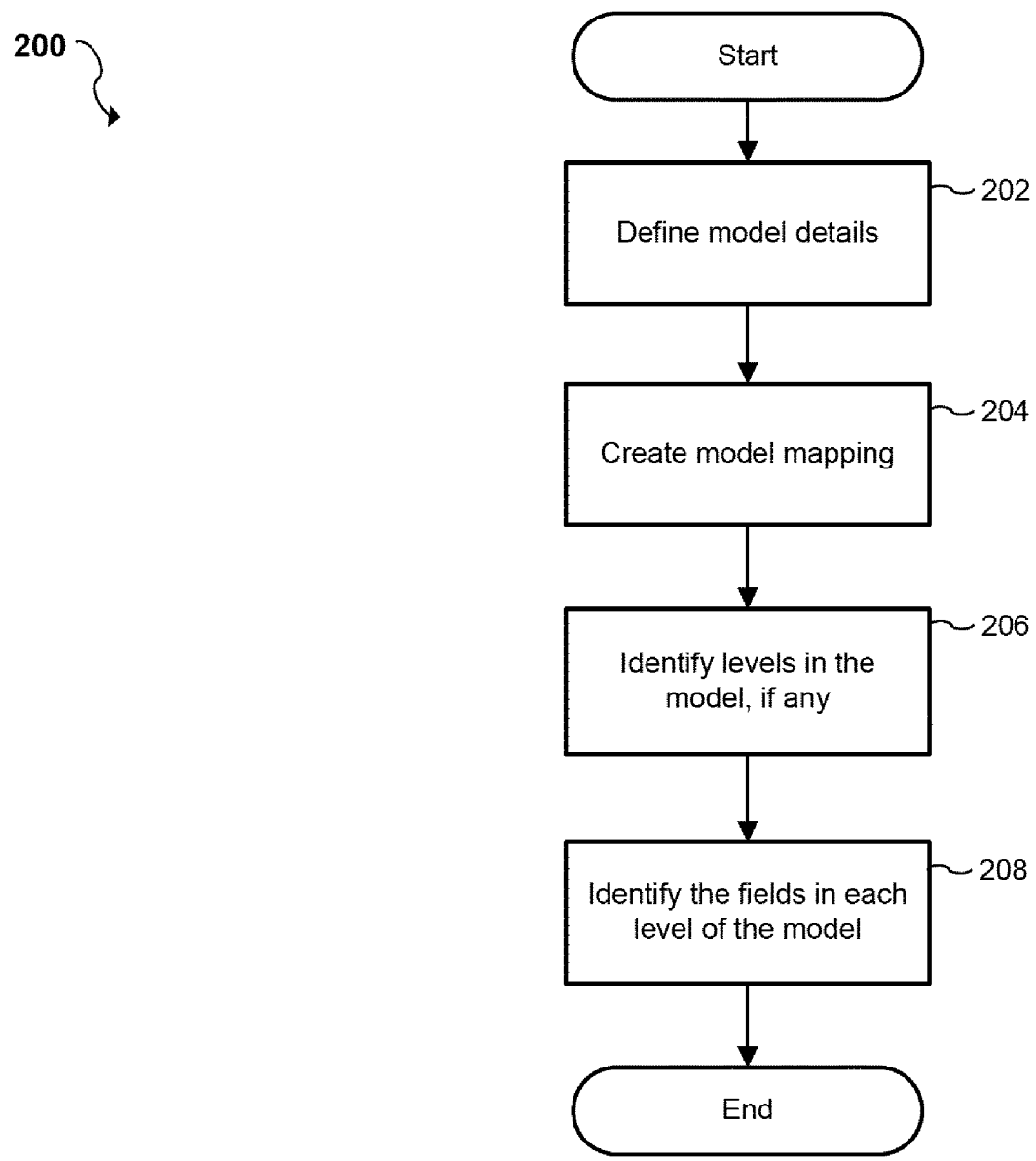

One or more new models are created at block 200. Creating a model involves several steps as illustrated in FIG. 9C. At block 202, model details are provided. A new model mapping is created at block 204. Optionally, one or more levels in the model are identified at block 206. At block 208, the fields in each level of the model are identified.

Figure 9D:
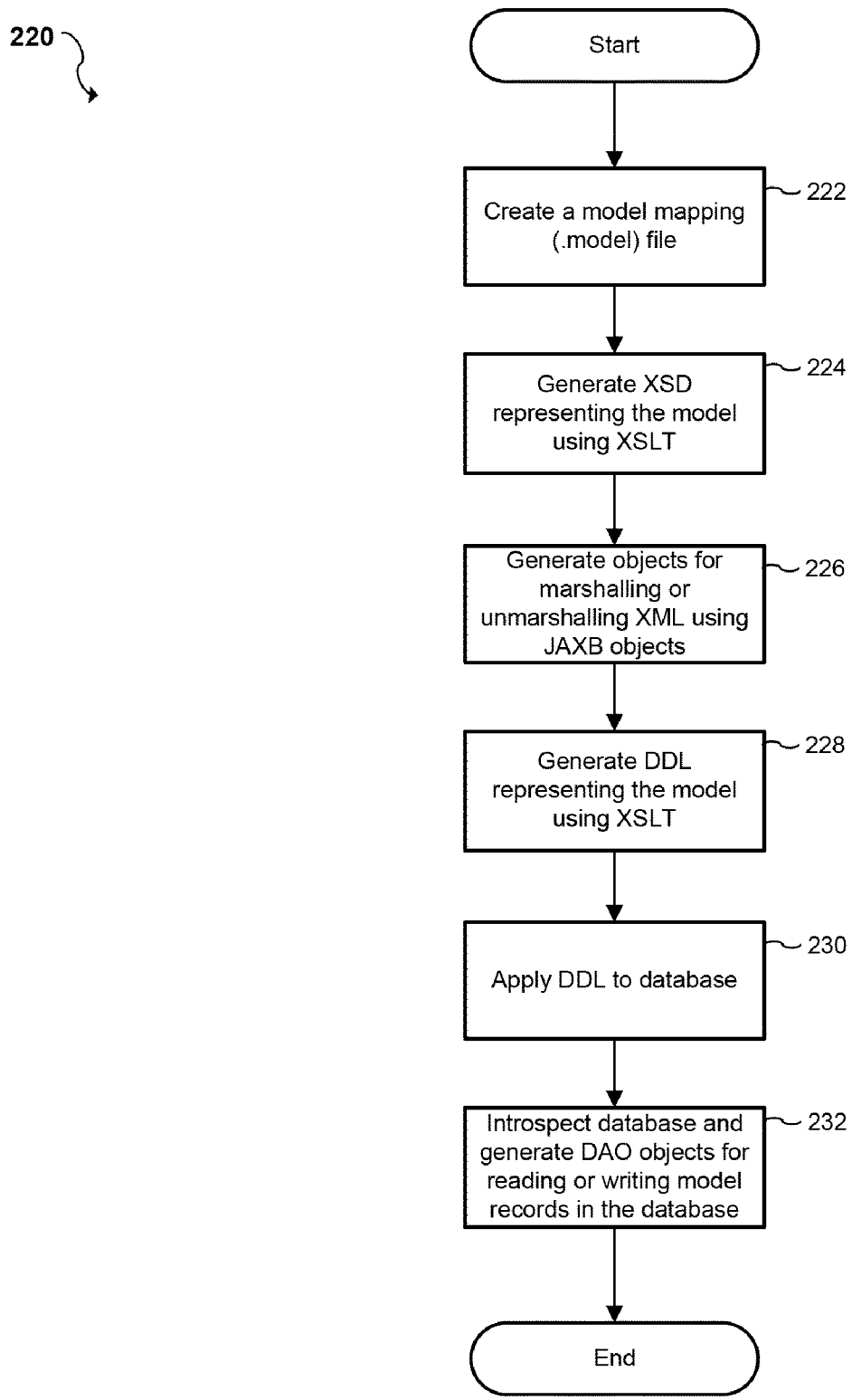
Figure 9E:
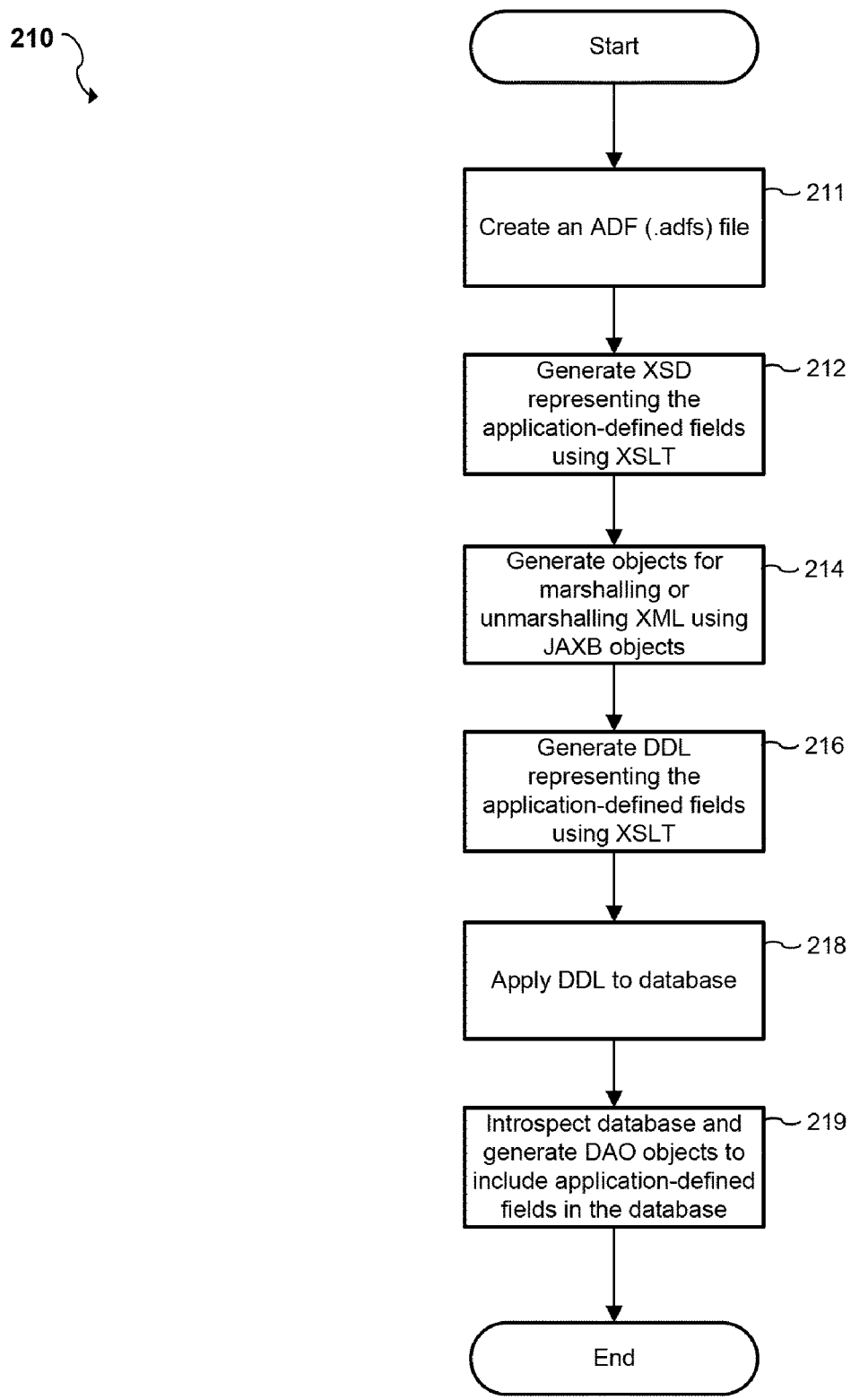

One or more new application-defined fields are grafted to one or more existing models at block 210. Grafting application-defined fields involves several steps as illustrated in FIG. 9E. An ADF file (.adfs) is created at block 211. At block 212, an XML schema definition ("XSD") representing the application-defined fields is generated using extensible stylesheet language transformations ("XSLT"). The XSD can be supplied as a child of a parent model at runtime using XSD substitutionGroups. At block 214, XML binding objects ("JAXB") are generated. JAXB objects can be used to marshal or unmarshal model data to or from XML. A DDL representing the application-defined fields is generated and using XSLT at block 216. The DDL may be used to add columns, foreign key constraints, indexes and the like to existing tables in a database. At block 218, the DDL is applied to a database. At block 219, introspection of the database occurs and Java data access objects ("DAO") are re-generated to include the newly added application-defined fields. In one embodiment, steps 212-219 are invoked via Microsoft Studio.

An application is built at block 220. In an embodiment of the present invention, building an application involves several steps as illustrated in FIG. 9D. A model mapping (.model) file is created at block 222. At block 224, an XML schema definition ("XSD") representing the model is generated using the model and extensible stylesheet language transformations ("XSLT"). The XSD allows the model to be integrated using XML. At block 226, XML binding objects ("JAXB") are generated. JAXB objects can be used to marshal or unmarshal model data to or from XML. A DDL representing the model is generated and using XSLT at block 228. The DDL may be used to create database tables or foreign key constraints, indexes and the like representing the model in a database. At block 230, the DDL is applied to a database. At block 232, introspection of the database occurs and Java data access objects ("DAO") are generated. DAOs can be used to easily read or write model data to or from the database. In one embodiment, steps 224-232 are invoked via Microsoft Studio.

Optionally, creating new models (step 190), grafting application-defined fields (step 200) and building the application (step 210) may be performed iteratively.

At block 240, the application is installed. Similar to an operating system, an application can be installed on a software platform, such as without limitation the One Network Platform developed by One Network Enterprises, Inc. According to one embodiment, the build process produces an installer. The installer is executed on a computer executing the software platform, such as without limitation the One Network Platform. The installer will apply the DDL and deploy all required Java classes and other resources for the application's models and application-defined fields. According to one embodiment, where an application has declared a dependency to another application's model or application-defined fields, the depended upon application is installed before the application requiring such dependency.

The application may be uninstalled at block 232. Similar to an operating system, an application can be uninstalled from a software platform, such as without limitation the One Network Platform. According to one embodiment, the uninstaller for the application (as described above with respect to installing an application) includes an uninstaller. The uninstaller will apply the DDL to drop tables and/or columns, and remove any required Java classes and/or other resources associated with that application's models and/or application-defined fields. This effectively ungrafts fields for all models associated with the application. According to one embodiment, where an application has declared a dependency to another application's model or application-defined fields, the application requiring such dependency must be uninstalled before the depended upon application.

Figure 8:
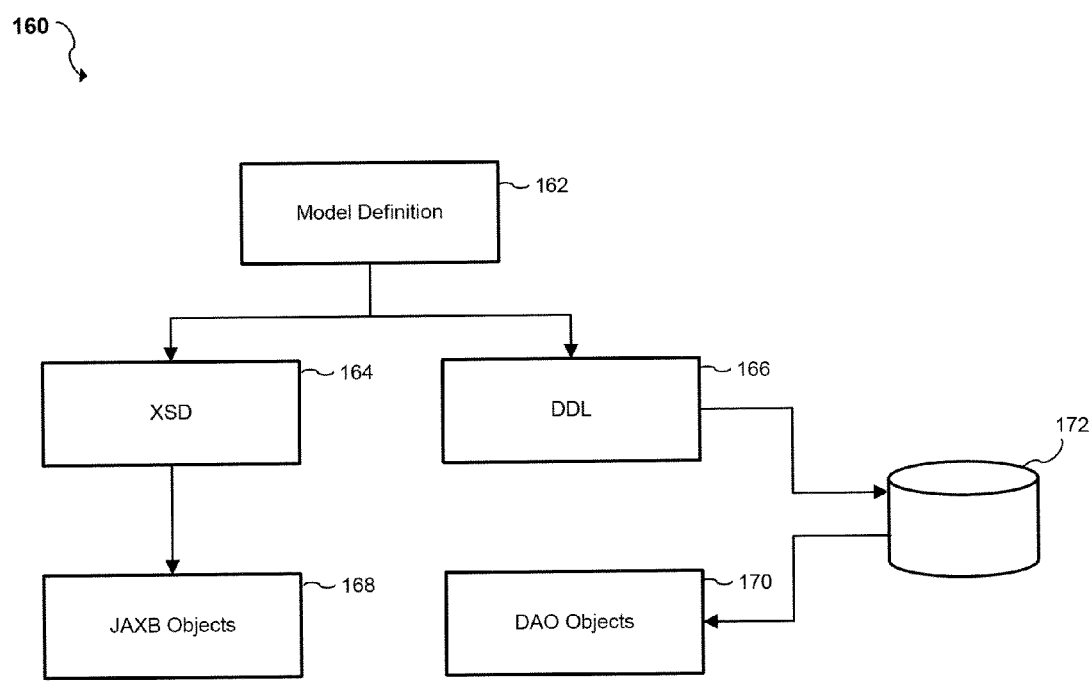
FIG. 8 is a block diagram illustrating resources generated using a model definition in accordance with an embodiment of the present invention.

Referring to FIG. 8, a block diagram illustrating resources generated using a model definition 162 in accordance with an embodiment of the present invention is shown. At block 164, an XML schema definition ("XSD") is generated using the model definition 162. The XSD allows the model to be integrated using XML. At block 168, Java API for XML binding objects ("JAXB") are generated. JAXB objects can be used to marshal or unmarshal model data to or from XML. A DDL is generated at block 166. The DDL may be used to create database tables or foreign key constraints, indexes and the like to capture the model in a database 172. The DDL is applied to the database 172. At block 170, Java data access objects ("DAO") are generated. DAOs can be used to easily read or write model data to or from the database 172.

Optionally, the present invention may also incorporate messaging between computer applications.

II. GRAFTED APPLICATION-DEFINED FIELDS

Grafted application-defined fields are added to existing database table(s) for the model being extended. For example, a "User" model may include "UserName" and "EmailAddress" fields which are each represented in a database table. A "SMP" application may define a "DriversLicenseNumber" application-defined field to be associated with the "User" model. In one embodiment, given the above example, a new column, such as "SMP_DRIVERS_LICENSE_NUMBER" is appended to the table that represents the "User" model. If other applications define additional application-defined fields, new columns are also appended to the table. For instance, a "SOC" application may define a SocialSecurityNumber application-defined field to be associated with the "User" model, and a "HLT" application may define Height and Weight application-defined fields to be associated with the "User" model resulting in "SOC_SOCIAL_SECURITY_NUMBER," "HLT_HEIGHT" and "HLT_WEIGHT" columns being appended to the table.

III. USER INTERFACES

Figure 10A:
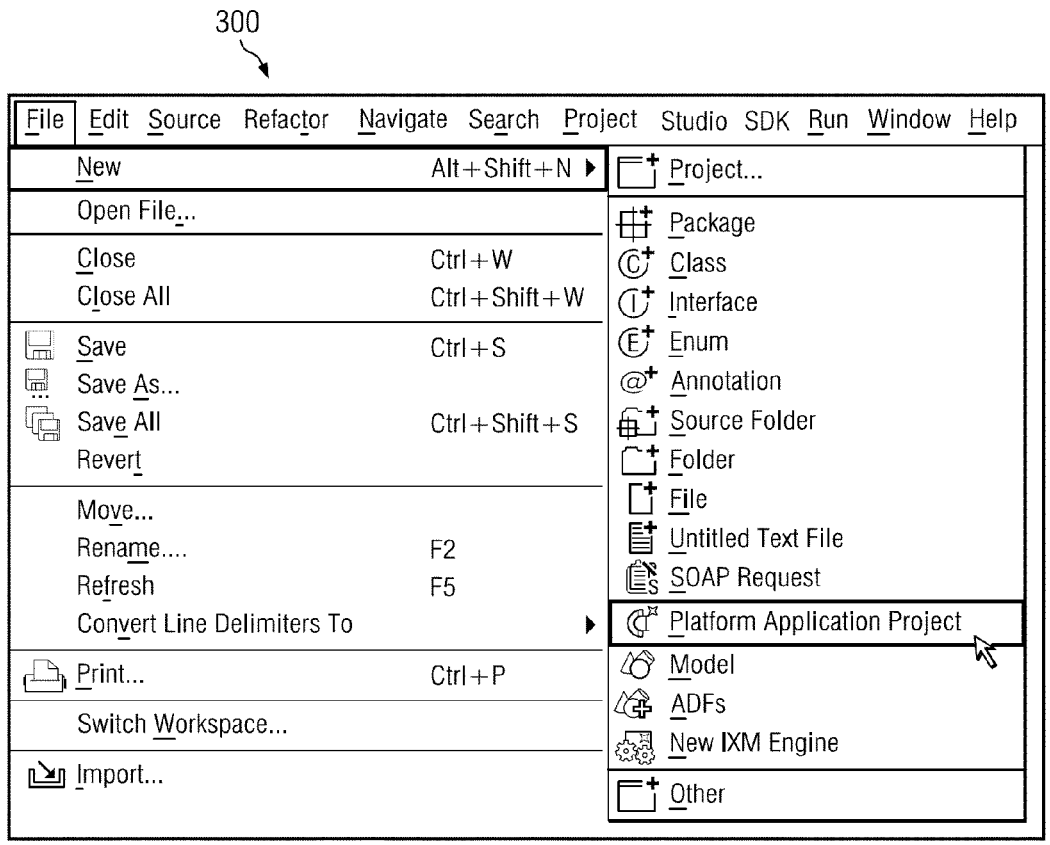
FIGS. 10A-10T illustrate an exemplary user interface and computer program for sharing information between multiple computer applications using a grafted model network in accordance with an embodiment of the present invention.
Figure 10B:
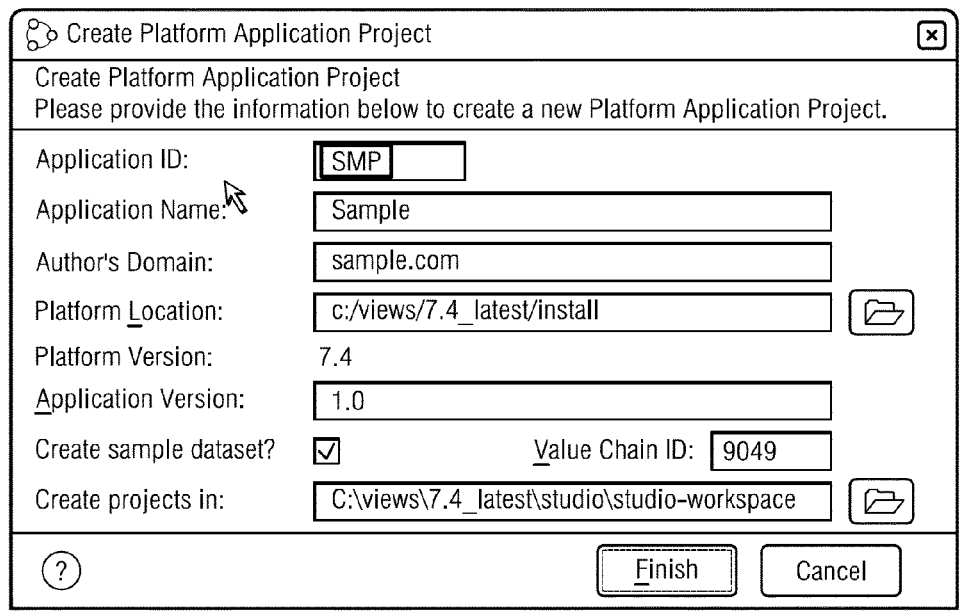

In one possible implementation of the present invention, an application is created (step 190) using the user interfaces shown in FIGS. 10A and 10B. Application details may be entered by a user in the creation of the application. Application details include without limitation an application identifier, an application name, an author's domain, a platform location, a platform version, an application version, a value chain identifier, a directory where the projects are created, and a yes or no indication of whether to create a sample dataset. As shown in FIG. 10B, the application identifier for the "Sample" application is "SMP."

Figure 10C:
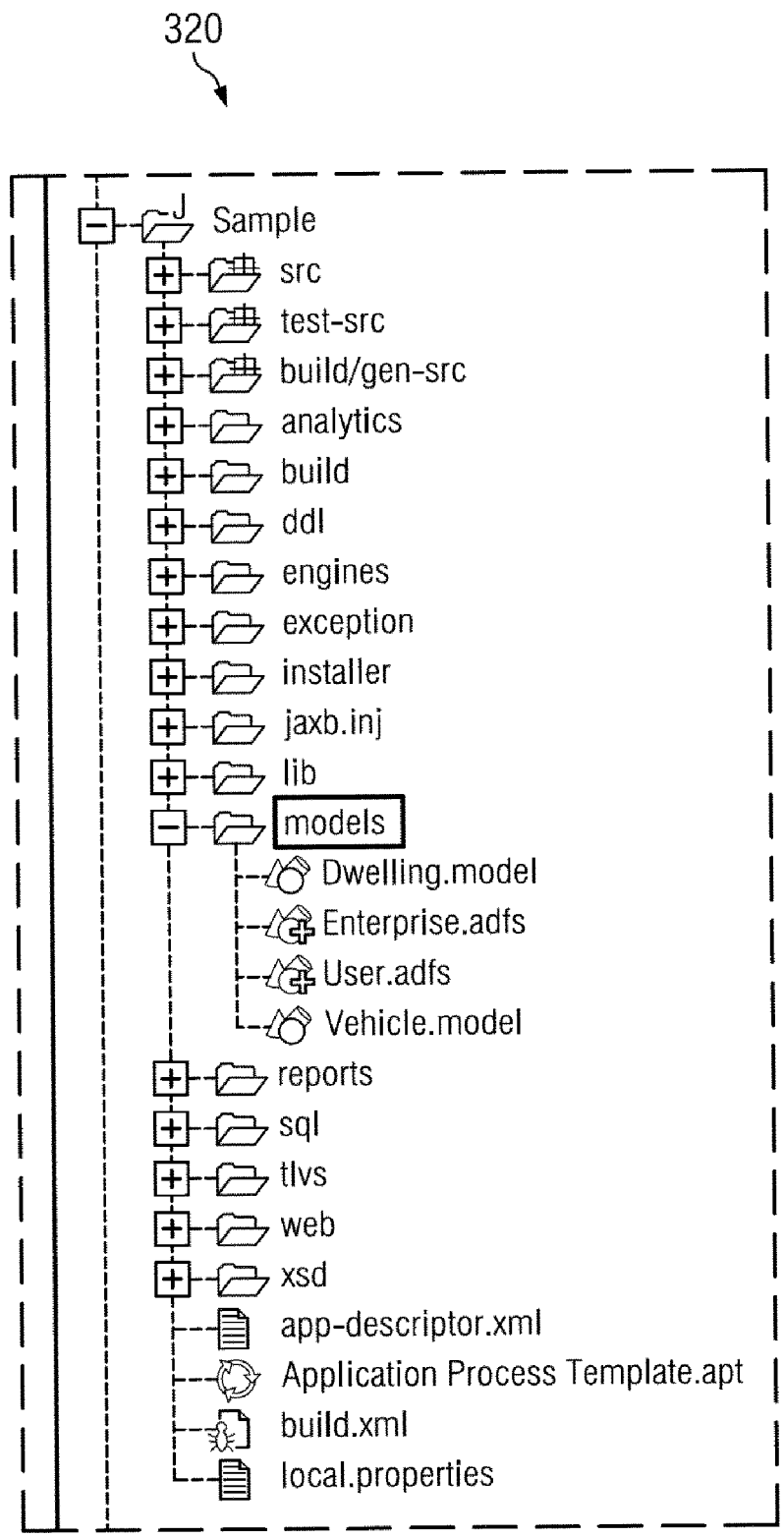

The exemplary content of an application is shown in FIG. 10C. As shown in FIG. 10C, the "Sample" application includes dwelling and vehicle models represented as "Dwelling.model" and "Vehicle.model," respectively, and enterprise and user application-defined fields represented as "Enterprise.adfs" and "User.adfs," respectively.

Applications may include one or more dependencies to other applications. Applications shall also have a dependency to the One Network Platform. Applications can use the models of other applications to which they depend. Applications can also graft application-defined fields to the models of application to which they depend. In one possible implementation of the present invention, dependencies are declared (step 194) using the user interface shown in FIG. 10D. Dependencies to other applications are identified using an application identifier. As shown in FIG. 10D, the "Sample" application includes dependencies to the applications having application identifiers "SCH" and "THS."

Figure 10E:
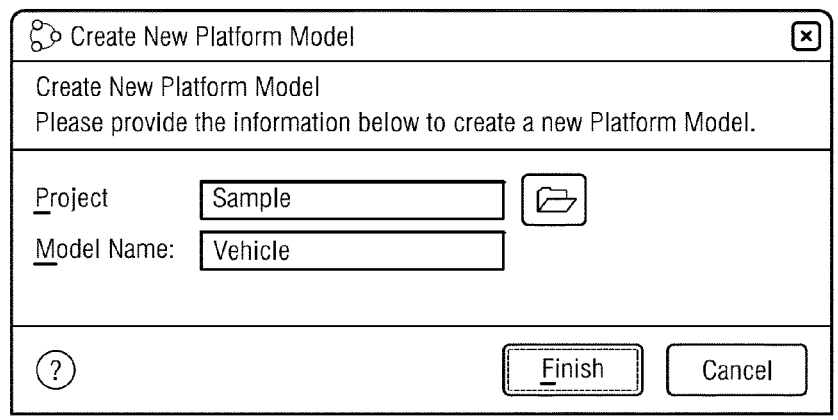
Figure 10G:
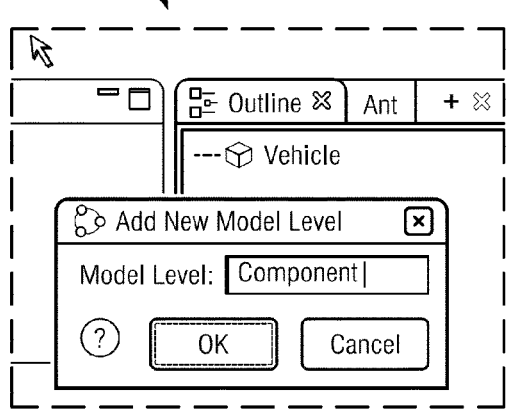
Figure 10H:
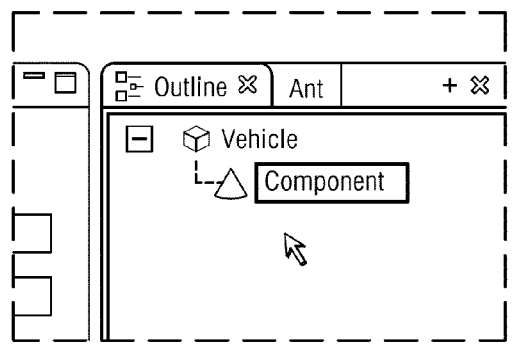
Figure 10F:
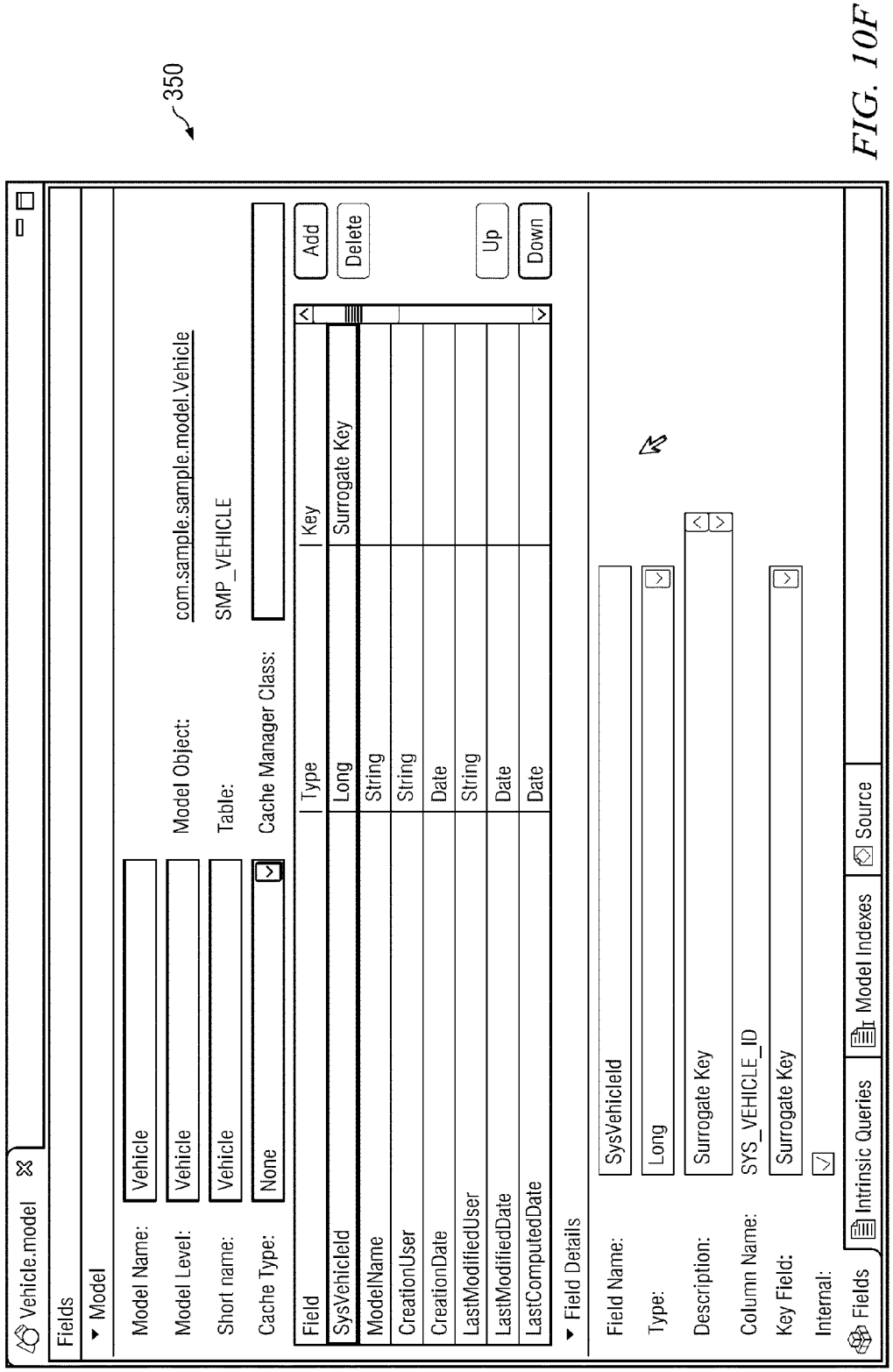
Figure 10I:
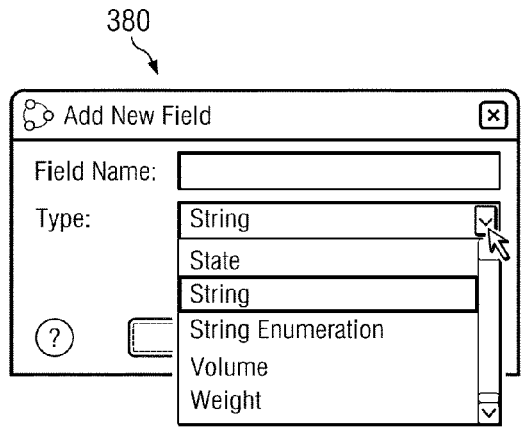
Figure 10J:
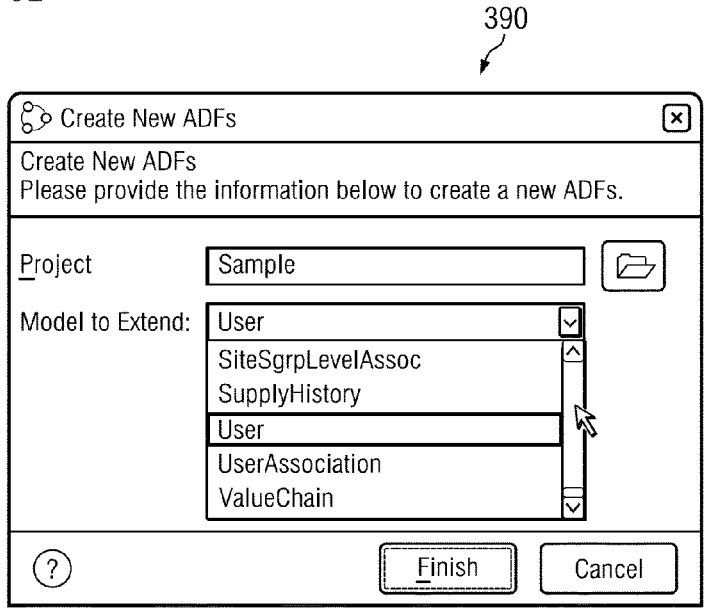
Figure 10K:
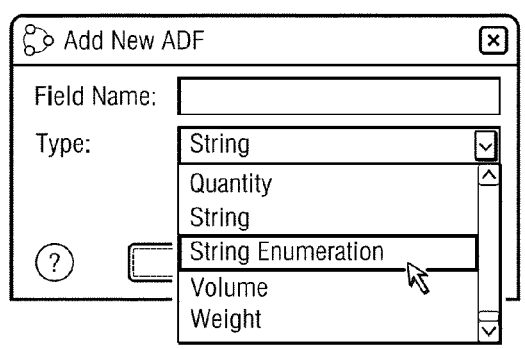

In one possible implementation of the present invention, one or more new models are created (step 200) using the user interfaces shown in FIGS. 10E and 10F. A model may be defined in a model file (.model), and consists of without limitation a model name, levels and one or more fields. A model name is used to identify the model. Levels represent large portions of a model and may be added using the user interface shown in FIG. 10G. For instance, an "Order" model might include an "OrderHead" and an "OrderLine" as two levels of the model. Fields represent data fields within the model. Each field includes without limitation a name, a type and a key. Types include without limitation Integer, Float, Monetary, DataRange, and the like.

The model may also include one or more methods. The one or more methods may be added to a model using the user interfaces shown in FIGS. 10R-10T. According to this embodiment, one or more code files (.code) are added to a directory containing java code fragments. The java code fragments may include both state (fields) and behavior (methods). The application is then built and includes the one or more methods. For instance, as shown in FIG. 10R, a Vehicle.code file that includes an accelerate method is added to a JAXB injection directory (jaxb.inj). The application may then be built as shown in FIG. 10S. Once built, the methods on the generated model class may be reviewed as shown in FIG. 10T.

In the field of object-oriented programming, inheritance allows a derived object to add fields and behavior to a base object. However, the present invention is distinct from object-oriented programming and, in particular, multiple inheritance. Unlike object-oriented programming, the present invention provides support for: (a) entire collections of objects and "object fragments" to be versioned; (b) collections to specify a version dependency on other collections; (c) collections to be installed and uninstalled as a unit; (d) a "complete" object to span multiple collections; and (e) collections to contain many artifacts other than objects, such as screens, schema definitions, reports, and the like.

Figure 10L:
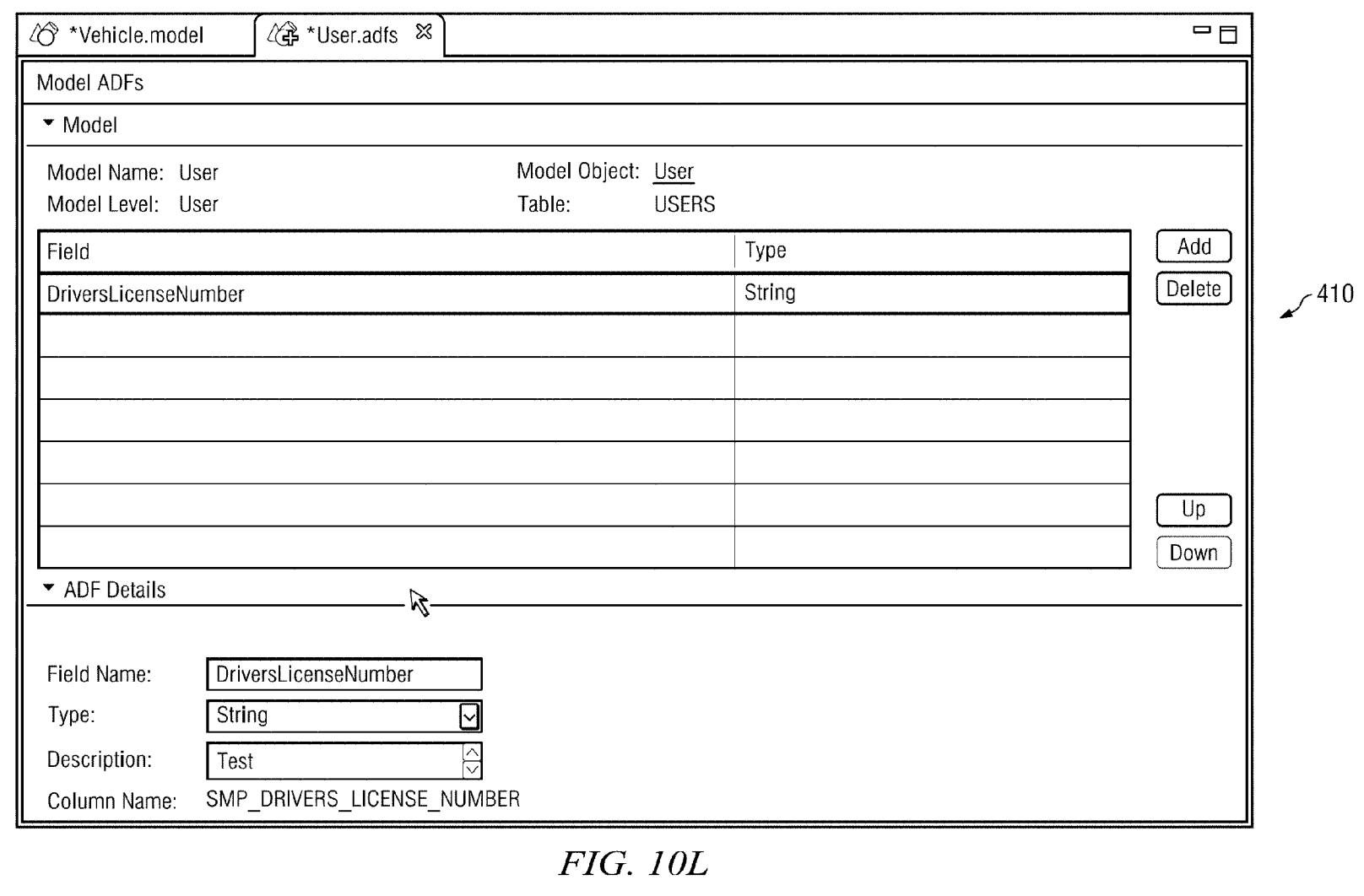

In one possible implementation of the present invention, application-defined fields are grafted to a model (step 210) using the user interface shown in FIG. 10L. Application-defined fields ("ADFs") allow an application to graft new fields onto existing models of other applications. Application-defined fields are grafted to one or more existing models from other applications, and consist of without limitation a model name and a field. The model name identifies the model. Fields represent data fields that will be grafted onto a model and become part of a grafted model. Each field includes without limitation a name and a type. Types include without limitation Integer, Float, Monetary, DataRange, and the like. Optionally, ADFs may be defined in an ADF file (.adfs) by a developer.

Figure 10M:
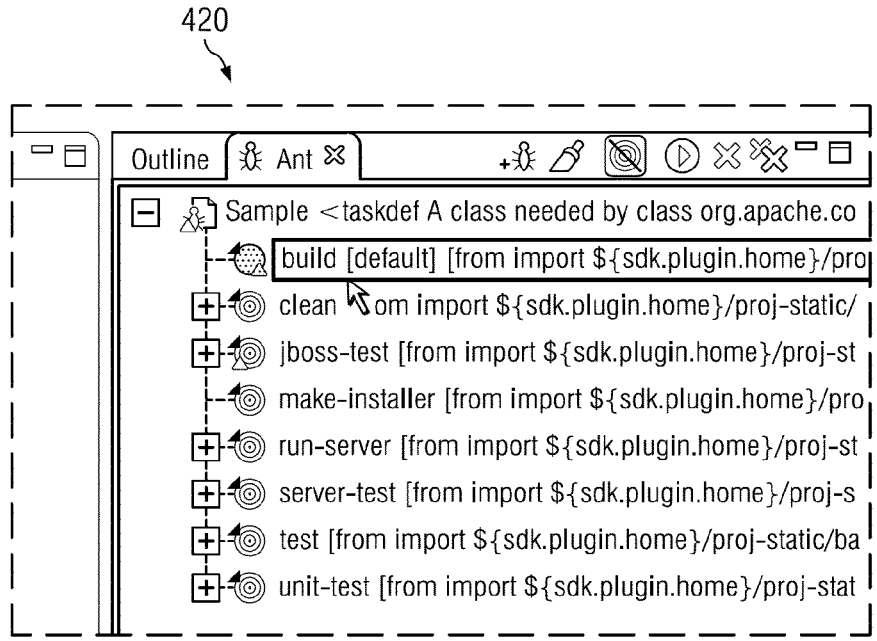
Figure 10S:
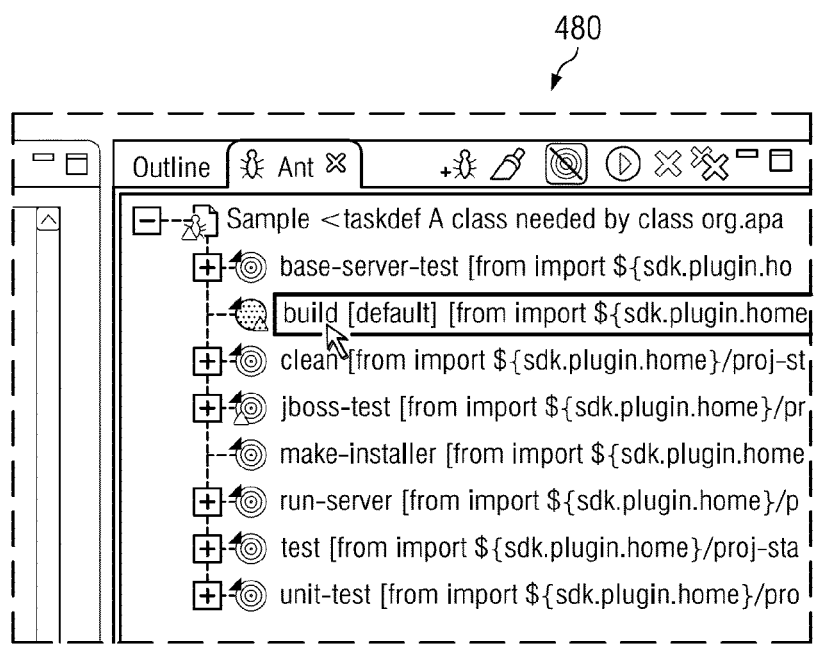
Figure 10R:
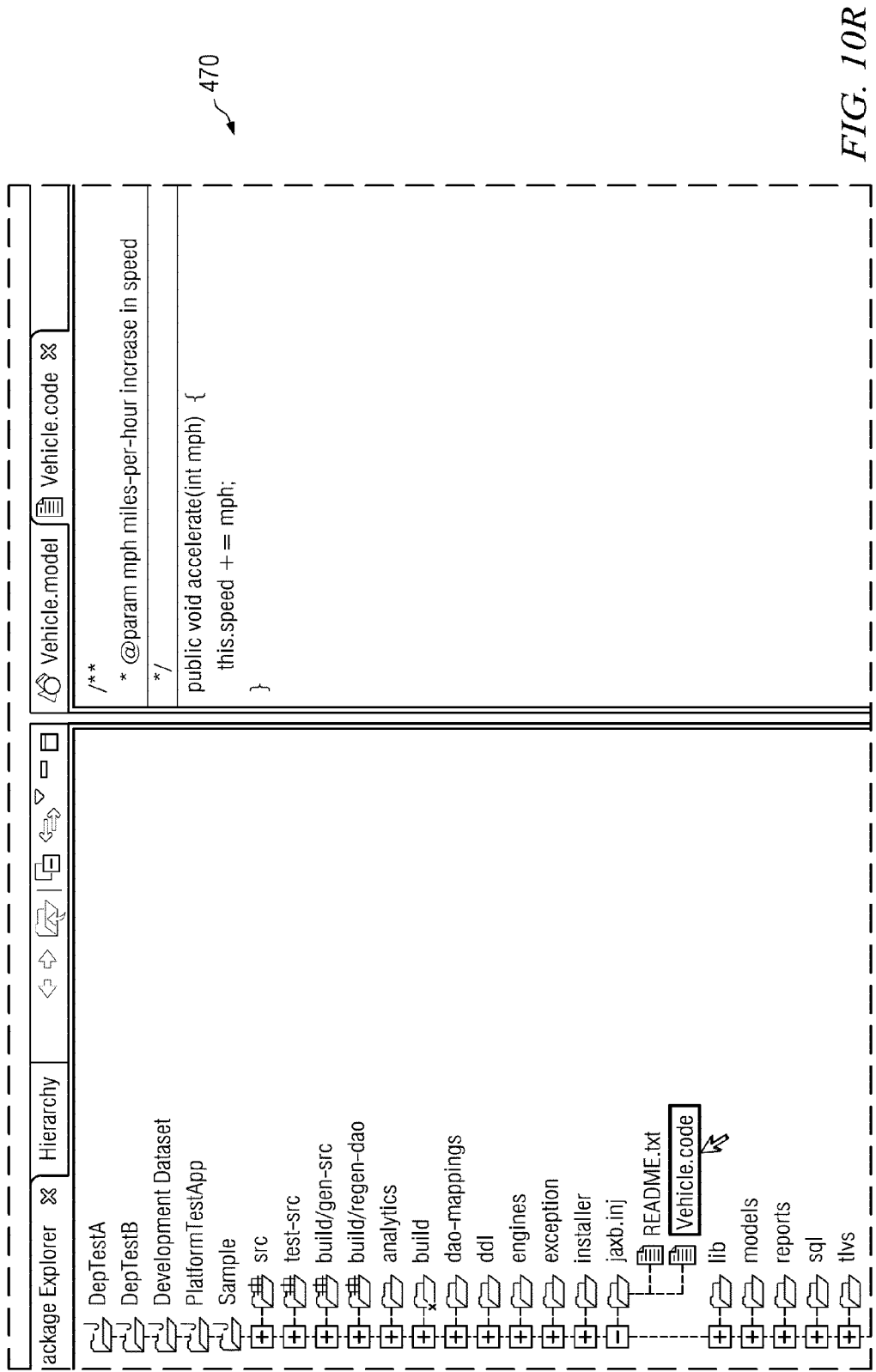
Figure 10T:
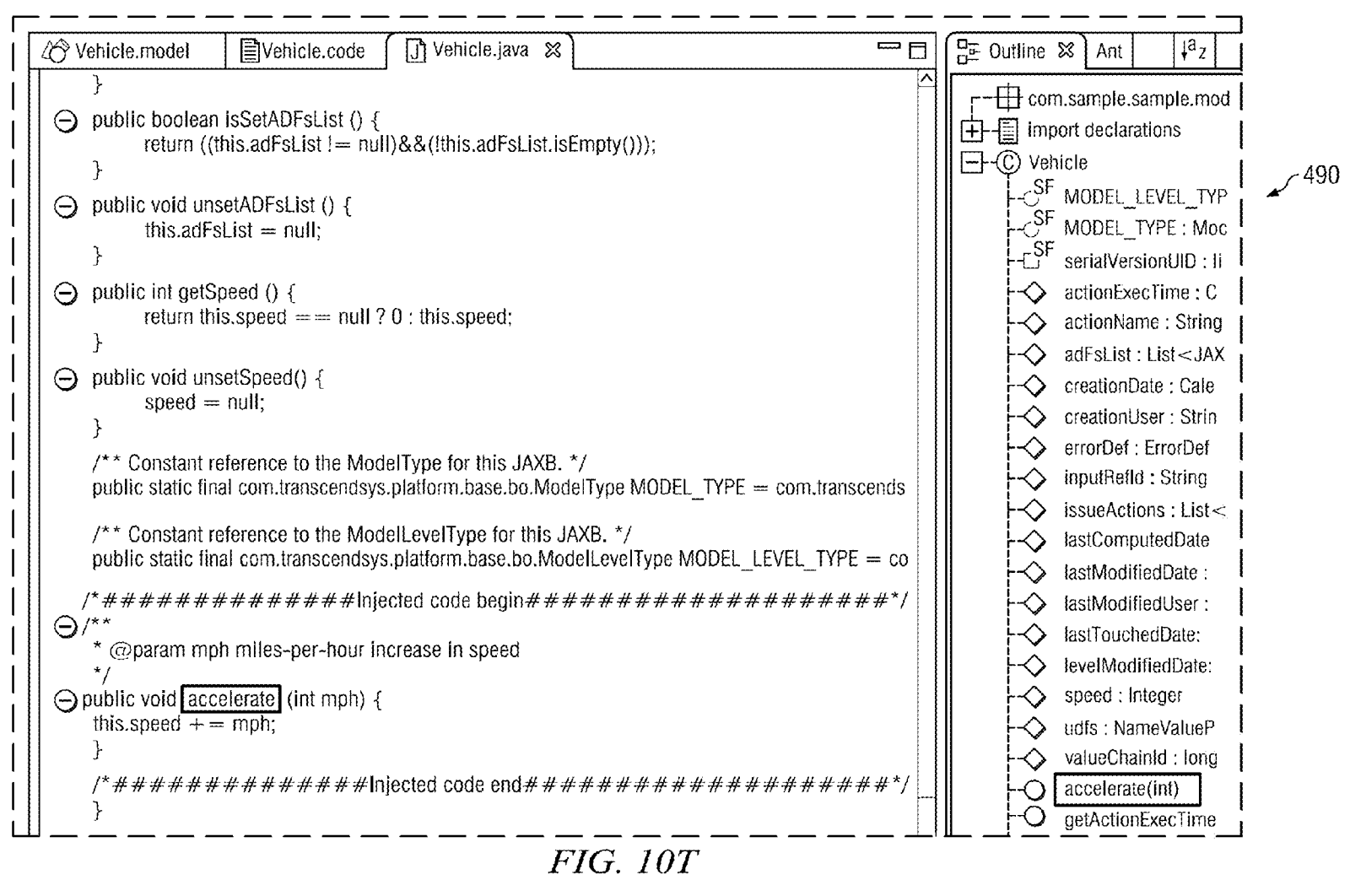

In one possible implementation of the present invention, an application is built (step 220) using the user interfaces shown in FIGS. 10M-10O. The build process takes model and/or ADF mappings and produces the resources detailed with respect to FIGS. 8 and 9D. The build process builds and deploys all resources as a unit (i.e., Model and/or ADF definitions are not built piecemeal).

According to one embodiment, all models support the following application programming interfaces ("APIs"):
  ModelList Model.read (ModelReadRequest)
  ModelList Model.write (ModelWriteRequest)

The above APIs provide uniform create, read, update and delete ("CRUD") support for all models, including all grafted models. In one possible implementation of the present invention, information relating to the Model.read and Model.write is defined using the user interfaces shown in FIGS. 10P-10Q, respectively. Such information includes without limitation any filter criteria, retrieval criteria, sort order and/or actions.

As shown in FIG. 10P, a "view" may be defined which describes filter criteria, retrieval criteria and sort order of a model and, thereby, what will be returned upon a Model.read request for that model. For example, the XML shown in FIG. 12B may be passed as a parameter to the Model.read request and the XML shown in FIG. 12A may be returned from the Model.read request.

As shown in FIG. 10Q, an "action" may be defined which describes the editability of fields and possible workflow to execute upon a Model.write request for that model. For example, the XML shown in FIG. 12D may be passed as a parameter to the Model.write request and the XML shown in FIG. 12C may be returned from the Model.write request.

According to one embodiment, the primary way in which an application interacts with the underlying software platform at runtime is through the model read/write API. This API provides an application with the ability to read and write models (including grafted models with all associated fields) from the database.

To read models from the database, a ModelList Model.read (ModelReadRequest) API is provided. The Model.read API passes a ModelReadRequest and returns a ModelList. The ModelReadRequest includes:
  ViewRef—a reference to a named view which defines a set of filter fields and retrieval fields (similar to a SQL Query).
  FilterValues—provides values to the filters declared in a view referenced by ViewRef.
    FilterValue (many)—a single filter value.
      FieldRef—identifies the field for which the filter is provided. May be a regular field or a grafted field.
      Values—value provided for the given filter field. Many values can be provided for a single filter field.
The ModelList contains the results of a query and includes:
  Model (many)—a Model is an abstract class extended by all models defined in SDK applications (grafted or otherwise). A ModelList contains subclass(es) for the model that were created in the application.
The software platform provides a way of specifying views (referenced with respect to ViewRef above). A View includes:
  Name—a unique identifier for the view.
  RetrievalCriteria (many)—identifies the fields to be retrieved.
    Field—identifies a field from a Model by name, and can be one of the Model's original fields, or a grafted ADF field.
  FilterCriteria—identifies the fields to be filtered when querying.
    FieldRef (many)—identifies a field from a model.
      Optional—indicates whether the field is required or optional.
To write models to the database, a ModelList Model.write (ModelWriteRequest) API is provided. The Model.write API passes a ModelWriteRequest and returns a ModelList. The ModelWriteRequest includes:
  ModelList—contains the models to be written.
    Model (many)—a model is an abstract class extended by all models defined in SDK applications (grafted or otherwise).
      ActionName—the base model class includes an optional action name. This references a named Action which qualifies how the write is to be performed.
The ModelList that is returned from a ModelWriteRequest contains the results of the write operation and includes:
  Model (many)—Only models for which the write failed will be returned in this list. The failure can be for a variety of reasons, including missing required fields, invalid references to other models, etc.
    Error—provides additional information about the write failure for this particular model.

The software platform provides a way of specifying the actions referenced by the ActionName above. An Action includes:
Name—unique identifier for the action.
ActionType—CREATE, UPDATE or DELETE.
WriteMask—identifies whether specific fields are required, optional, or ignored (will not be updated).
FieldInfo (many)
> FieldRef—identifies the model field for which editability is being specified. Can be a regular or grafted field.
> FieldMask—REQUIRED (meaning must be provided), OPTIONAL (meaning may be provided but is not required), or IGNORED (meaning may be provided, but will not be written to the database).

Additional APIs may be provided by the underlying software platform at runtime. As all models have XML representations, the software platform must provide a mechanism for converting XML representations of models into java representations of the same, and vice versa. This XML marshalling/unmarshalling must handle all pre-defined fields and application-defined fields for each model, based on their ".model" and ".adfs" metadata. The API unmarshal and marshal includes:

public Model unmarshal(InputStream)—Converts streamed XML data into a java Model object. An appropriate subclass of Model shall be returned based on the tags in the incoming data.

public void marshal(Model, OutputStream)—Converts a java Model object into a stream of XML data.

The software platform may also include support for several buildtime APIs. These are not used by running applications, but are instead used to build/install or uninstall applications into a software platform instance. The buildtime APIs include:

public void build(File applicationRoot)—the outcode of the build API is shown in FIGS. 9D and 9E.

public void clean(File applicationRoot)—This API is the inverse of the build( )API and deletes all generated resources and drops all tables/columns from the database related to the application being "cleaned".

IV. EXAMPLES

Each of the below examples are intended as non-limiting examples.

Example 1

Figure 11A:
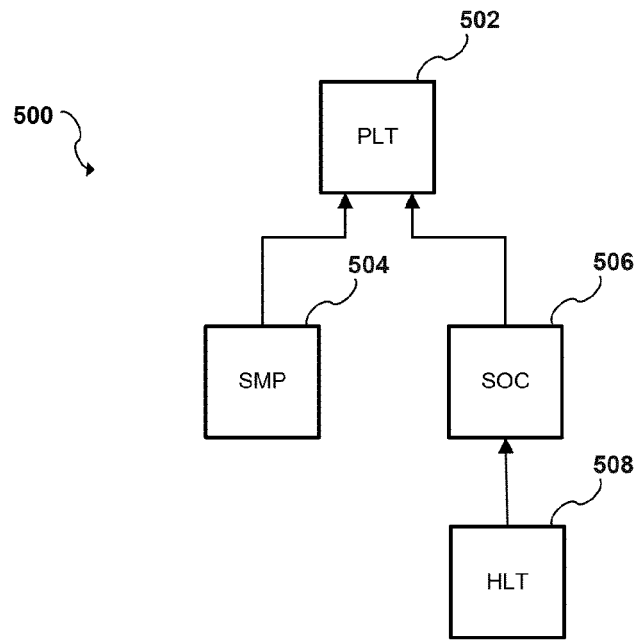
FIGS. 11A-11B are block diagrams illustrating an exemplary grafted model in accordance with an embodiment of the present invention.
Figure 11B:
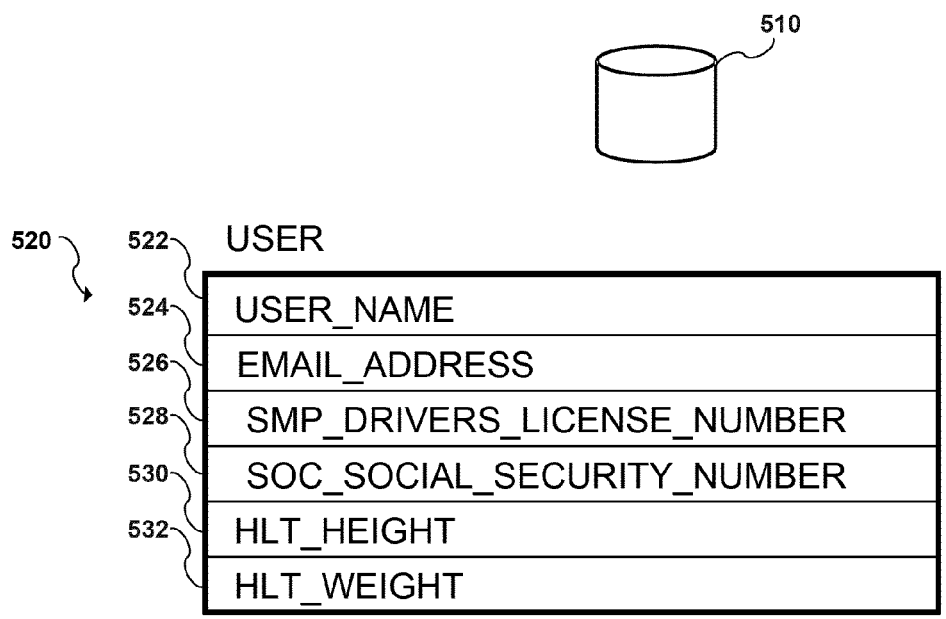

Referring to FIGS. 11A-11B, block diagrams illustrating an exemplary grafted model in accordance with an embodiment of the present invention are shown. According to this example, there is only one database table to represent a User model. However, each application may have a different perspective of the table based on its dependencies. For this example, assume the following:

PLT application 502 defines a User model which includes a UserName field and a EmailAddress field. The User model is stored in a database 510 which includes User_Name 522 and Email Address 524 which respectively correspond to the UserName and EmailAddress fields in the User model.

SMP application 504 declares a dependency to PLT application 502 and grafts DriversLicenseNumber application-defined field to the User model. Database 510 is updated to include SMP_Drivers_License_Number 526 which corresponds to the DriversLicenseNumber application-defined field.

SOC application 506 declares a dependency to PLT application 502 and grafts SocialSecurityNumber application-defined field to the User model. Database 510 is updated to include SOC_Social_Security_Number 528 which corresponds to the SocialSecurityNumber application-defined field.

HLT application 508 declares a dependency to SOC application 506 and grafts Height and Weight application-defined fields to the User model. Database 510 is updated to include HLT_Height 530 and HLT_Weight 532 which respectively correspond to the Height and Weight application-defined fields.

Based upon the above assumptions: (i) only User_Name 522 and Email_Address 524 would be visible to PLT application 502; (ii) only User_Name 522, Email_Address 524 and SMP_Drivers_License Number 526 would be visible to SMP application 504; (iii) only User_Name 522, Email_Address 524, SOC_Social_Security_Number 528 would be visible to SOC application 506; and (iv) only User_Name 522, Email_Address 524, SOC_Social_Security_Number 528, HLT_Height 530 and HLT_Weight 532 would be visible to HLT application 508.

Example 2

Figure 3:
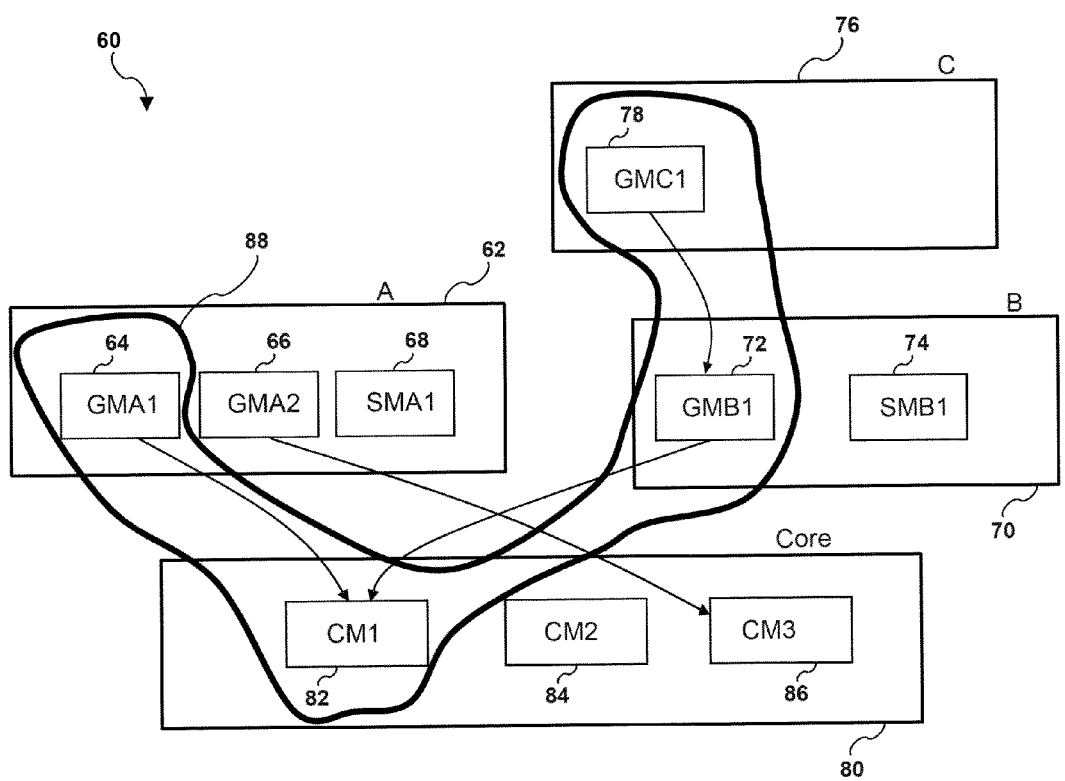
FIGS. 3-5 are block diagrams illustrating an exemplary model fusion in accordance with an embodiment of the present invention.
Figure 4:
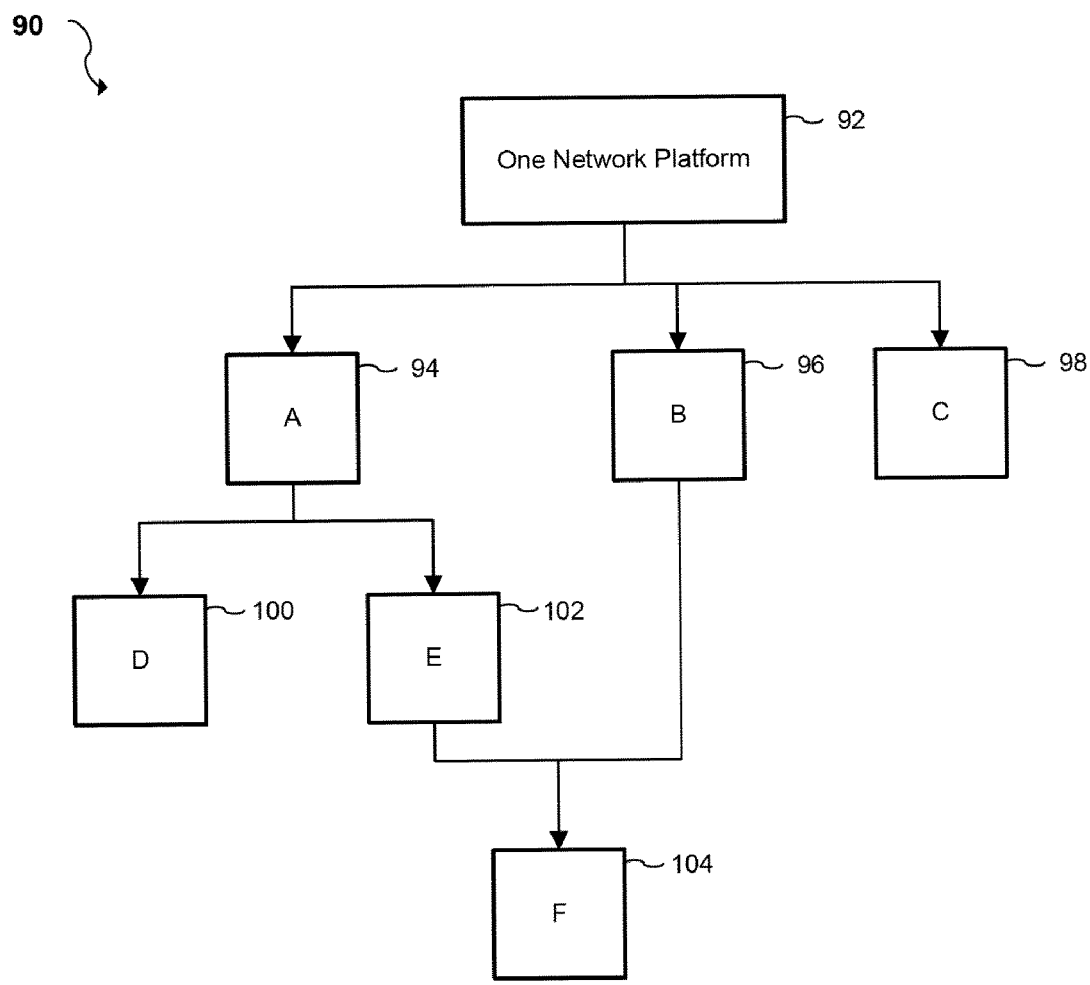
Figure 5:
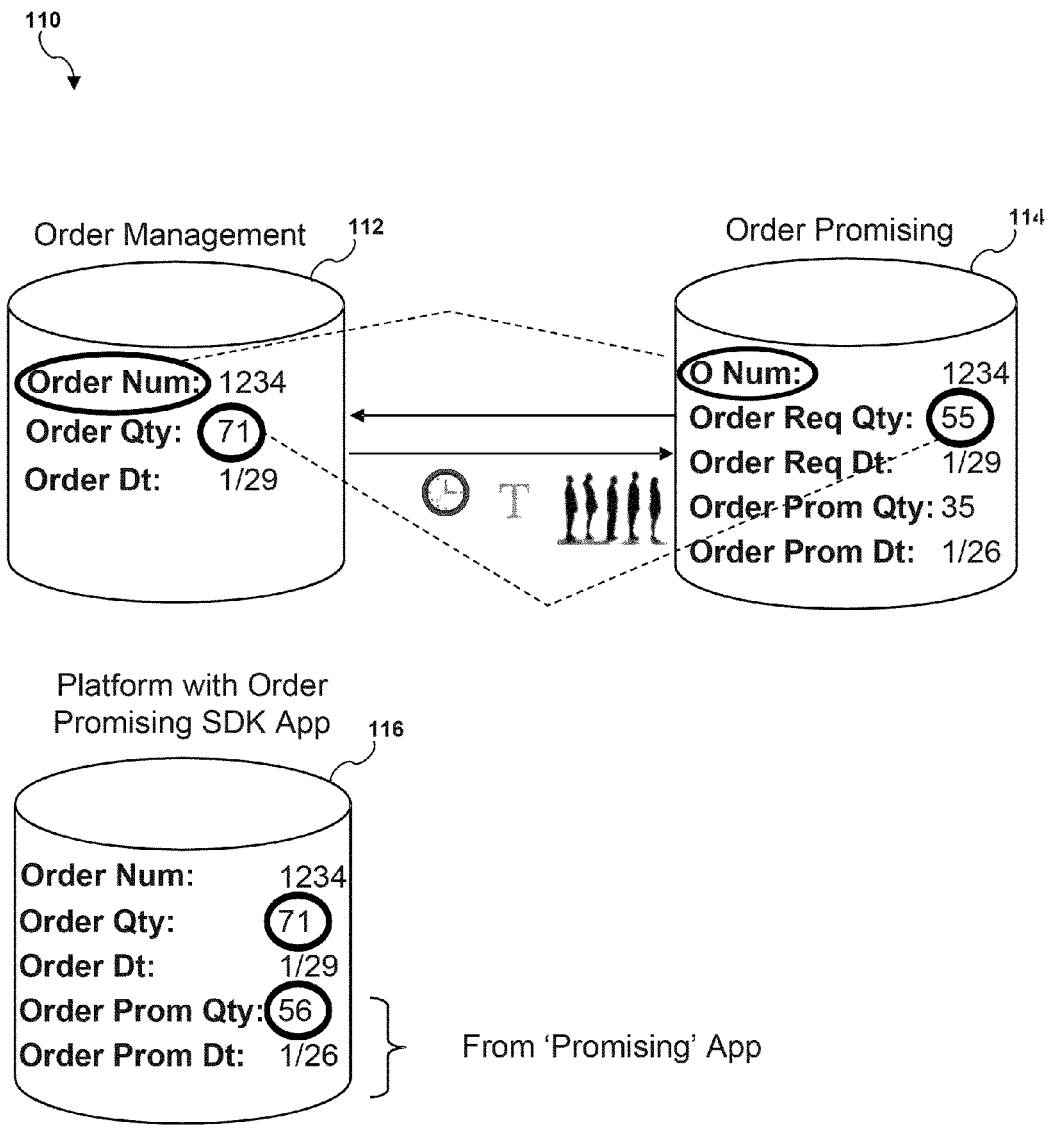

Referring to FIG. 3, a block diagram illustrating an exemplary model fusion in accordance with an embodiment of the present invention is shown. As shown in this example, application "A" 62 includes grafted modals GMA1 64 and GMA2 66, and stand-alone model SMA1 68. GMA1 is grafted onto model CM1 82, and GMA2 66 is grafted onto model CM3 86. Based on this, the CM1 model 82 is visible to the GMA1 model 64 and the CM3 model 86 is visible to the GMA2 model 66. Application "B" 70 includes grafted model GMB 1 72 and stand-alone model SMB1 74. GMB1 72 is grafted onto model CM1 82. Based on this, the CM1 model 82 is visible to the GMB 1 model 72. Application "C" 76 includes grafted model GMC 1 78. GMC1 78 is grafted onto model GMB1 72. Based on this, the GMB1 72 and CM1 82 model are visible to the GMC1 model 78.

Example 3

Application "A" defines model "A" which includes fields $A_1$, $A_2$ and $A_3$. A database table "A" is created which represents model "A". Database table "A" includes database columns $A_1$, $A_2$ and $A_3$ which respectively correspond to fields $A_1$, $A_2$ and $A_3$ fields in model "A." Database columns $A_1$, $A_2$ and $A_3$ are visible to application "A."

Application "B" defines application-defined fields $B_1$ and $B_2$ to model "A". Additional database columns $A_4$ and $A_5$, which respectively correspond to application-defined fields $B_1$ and $B_2$, are added to database table "A". Database columns $A_1$, $A_2$, $A_3$, $A_4$ and $A_5$ are visible to application "B."

Application "C" defines application-defined fields $C_1$ and $C_2$ to model "A". Additional database columns $A_6$ and $A_7$, which respectively correspond to application-defined fields $C_1$ and $C_2$, are added to database table "A". Database columns $A_1$, $A_2$, $A_3$, $A_6$ and $A_7$ are visible to application "C."

Application "D" depends on model "A" of application "A". Database columns $A_1$, $A_2$ and $A_3$ are visible to application "D."

Application "E" defines model "E" which includes fields $E_1$, $E_2$ and $E_3$ at level $EL_1$ and fields $E_4$ and $E_5$ at level $EL_2$. A database table "$EL_1$" is created which represents level model $EL_1$ of model "E," and a database table "$EL_2$" is created which represents level model $EL_2$ of model "E." Database table "$EL_1$" includes database columns $E_1$, $E_2$ and $E_3$ which respectively correspond to fields $E_1$, $E_2$ and $E_3$ fields in model "E." Database table "$EL_2$" includes database columns $E_4$ and $E_5$ which respectively correspond to fields $E_4$ and $E_5$ fields in model "E." Database columns $E_1$, $E_2$, $E_3$, $E_4$ and $E_5$ are visible to application "E."

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A computer program product embodied on a non-transitory computer readable storage medium for sharing information between multiple computer applications using a grafted model network, the computer program product comprising:
    a first computer code for creating first and second application projects having a plurality of user-defined application details, wherein the first application project is associated with a first computer application, and the second application project is associated with a second computer application;
    a second computer code for creating a first model having one or more pre-defined fields;
    a third computer code for defining one or more application-defined fields;
    a fourth computer code for associating the first model with the first application project;
    a fifth computer code for associating the one or more application-defined fields with the second application project;
    a sixth computer code for grafting the one or more application-defined fields to the first model;
    a seventh computer code for building the first application project, wherein building the first application project comprises creating a first database table having one or more table columns corresponding to the pre-defined fields of the first model in a database;
    an eighth computer code for building the second application project, wherein building the second application project comprises adding one or more table columns to the first database table corresponding to the application-defined fields in the database; and
    a ninth computer code for dynamically installing the first and second application projects on a software platform, wherein dynamically installing the first application project enables the one or more table columns corresponding to the pre-defined fields of the first model to be accessed via the software platform by the first computer application upon execution, and dynamically installing the second application project enables the one or more table columns corresponding to the pre-defined fields of the first model and the application-defined fields to be accessed via the software platform by the second computer application upon execution.

2. The computer program product of claim 1, further comprising:
    a tenth computer code for creating a third application project having one or more of user-defined application details, wherein the third application project is associated with a third computer application;
    an eleventh computer code for creating a second model having one or more pre-defined fields;
    a twelfth computer code for associating the second model with the third application project;
    a thirteenth computer code for defining a user-defined dependency from the second model to the first model;
    a fourteenth computer code for building the third application project, wherein building the second application project comprises adding one or more table columns to a second database table corresponding to the pre-defined fields of the second model in the database; and
    a fifteenth computer code for dynamically installing the third application project on the software platform, wherein dynamically installing the second application project enables the one or more table columns corresponding to the pre-defined fields of the first and second models to be accessed via the software platform by the third computer application upon execution.

3. The computer program product of claim 1, further comprising:
    a tenth computer code for creating a third model having first and second levels, each level one or more pre-defined fields;
    an eleventh computer code for associating the third model with the first application project; and
    a twelfth computer code for rebuilding the first application project, wherein rebuilding the first application project comprises creating second and third database tables, each having one or more table columns corresponding respectively to the pre-defined fields of the first and second levels of the third model in the database; and
    a thirteenth computer code for dynamically reinstalling the first application project on a software platform, wherein dynamically reinstalling the first application project enables the one or more table columns corresponding to the pre-defined fields of the first model and the first and second levels of the third model to be accessed via the software platform by the first computer application upon execution.

4. The computer program product of claim 1, further comprising a tenth computer code for dynamically uninstalling the first and second application projects on a software platform.

5. The computer program product of claim 2, wherein the first and second models are stored in respective first and second model files, and the first and second application projects are built using the respective first and second model files.

6. The computer program product of claim 1, wherein the first and second computer applications were developed by different computer software vendors.

7. The computer program product of claim 1, wherein the first and second computer applications maintain a single version of the truth with respect to the shared information.

8. A method for sharing information between multiple computer applications using a grafted model network, the method comprising:

creating first and second application projects having a plurality of user-defined application details, wherein the first application project is associated with a first computer application, and the second application project is associated with a second computer application;

creating a first model having one or more pre-defined fields;

defining one or more application-defined fields;

associating the first model with the first application project;

associating the one or more application-defined fields with the second application project;

grafting the one or more application-defined fields to the first model;

building the first application project, wherein building the first application project comprises creating a first database table having one or more table columns corresponding to the pre-defined fields of the first model in a database;

building the second application project, wherein building the second application project comprises adding one or more table columns to the first database table corresponding to the application-defined fields in the database; and dynamically installing the first and second application projects on a software platform, wherein dynamically installing the first application project enables the one or more table columns corresponding to the pre-defined fields of the first model to be accessed via the software platform by the first computer application upon execution on a computer, and dynamically installing the second application project enables the one or more table columns corresponding to the pre-defined fields of the first model and the application-defined fields to be accessed via the software platform by the second computer application upon execution on the computer.

9. The method of claim 8, further comprising:

creating a third application project having one or more of user-defined application details, wherein the third application project is associated with a third computer application;

creating a second model having one or more pre-defined fields;

associating the second model with the third application project;

defining a user-defined dependency from the second model to the first model;

building the third application project, wherein building the second application project comprises adding one or more table columns to a second database table corresponding to the pre-defined fields of the second model in the database; and dynamically installing the third application project on the software platform, wherein dynamically installing the second application project enables the one or more table columns corresponding to the pre-defined fields of the first and second models to be accessed via the software platform by the third computer application upon execution.

10. The method of claim 8, further comprising:

creating a third model having first and second levels, each level one or more pre-defined fields;

associating the third model with the first application project; and rebuilding the first application project, wherein rebuilding the first application project comprises creating second and third database tables, each having one or more table columns corresponding respectively to the pre-defined fields of the first and second levels of the third model in the database; and dynamically reinstalling the first application project on a software platform, wherein dynamically reinstalling the first application project enables the one or more table columns corresponding to the pre-defined fields of the first model and the first and second levels of the third model to be accessed via the software platform by the first computer application upon execution.

* * * * *